United States Patent [19]

Kudo et al.

[11] Patent Number: 4,600,937
[45] Date of Patent: Jul. 15, 1986

[54] DIGITAL TELEVISION RECEIVER WITH DIGITAL SYNC/REPRODUCTION CIRCUIT

[75] Inventors: Yukinori Kudo, Fujisawa; Susumu Suzuki, Kawasaki, both of Japan

[73] Assignee: Tokyo Shibaura Denki Kabushiki Kaisha, Kawasaki, Japan

[21] Appl. No.: 517,444

[22] Filed: Jul. 26, 1983

[30] Foreign Application Priority Data

Jul. 30, 1982 [JP] Japan ............... 57-132271

[51] Int. Cl.4 .............................. H04N 9/64
[52] U.S. Cl. ....................... 358/21 R; 358/27; 358/31
[58] Field of Search ............ 358/21 R, 31, 26, 19, 358/27, 38, 39, 40, 148, 150

[56] References Cited

U.S. PATENT DOCUMENTS 4,270,139  5/1981  Flamm ............... 358/21 R
4,491,862  1/1985  Flamm ............... 358/21 R Primary Examiner—Michael A. Masinick
Attorney, Agent, or Firm—Cushman, Darby and Cushman

[57] ABSTRACT

A digital television receiver has a digital conversion circuit for converting an analog video signal to a digital video signal, a process circuit for composing digital RGB signals from the digital video signal, a timing control circuit for controlling the A/D converting operation of the digital conversion circuit and the composing operation of the color process circuit.

8 Claims, 39 Drawing Figures

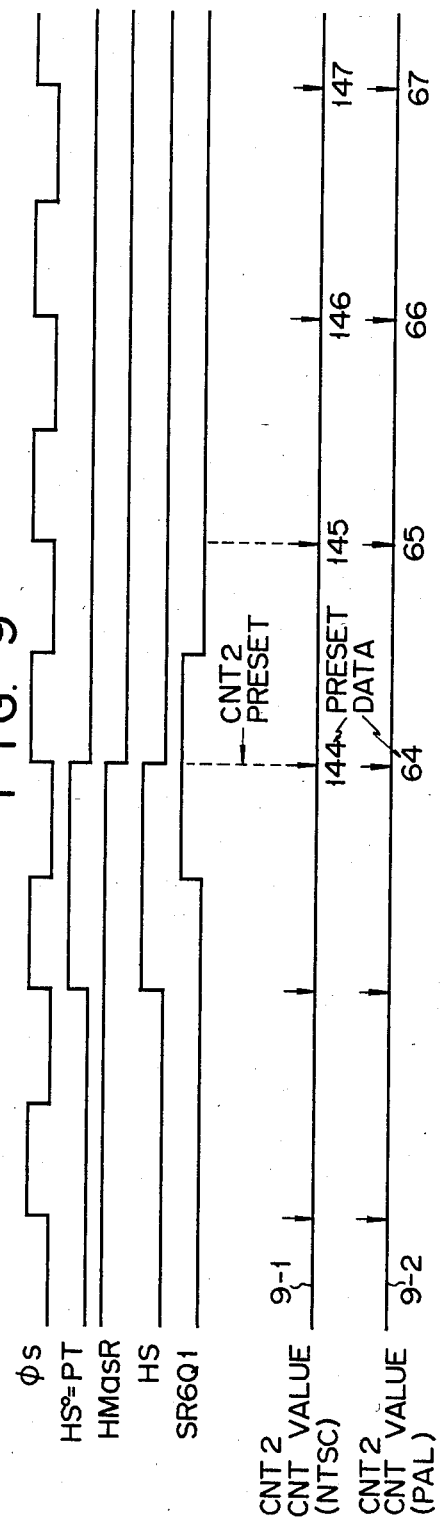
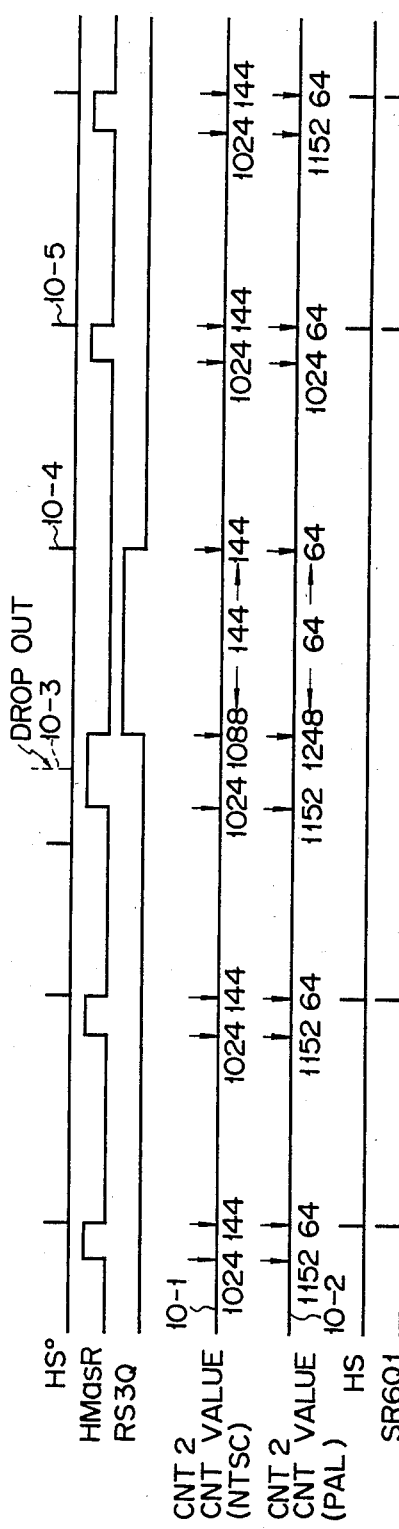

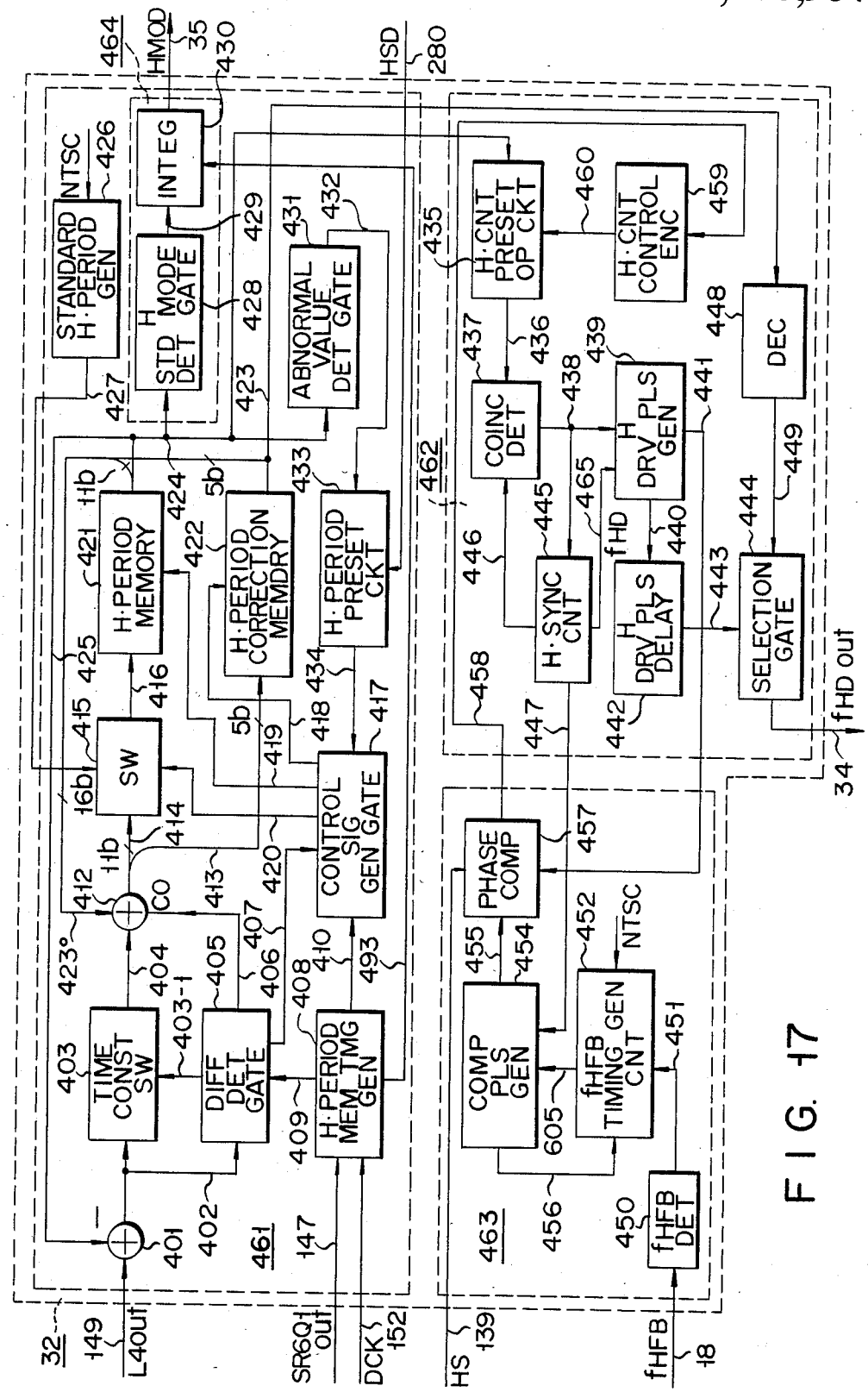
F I G. 17

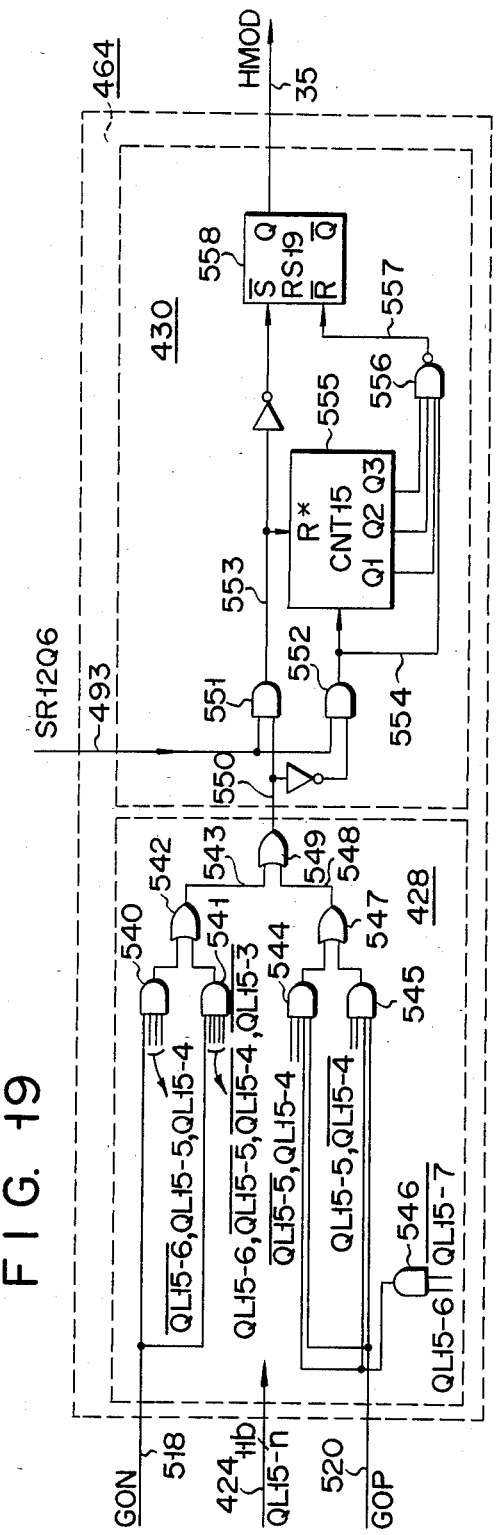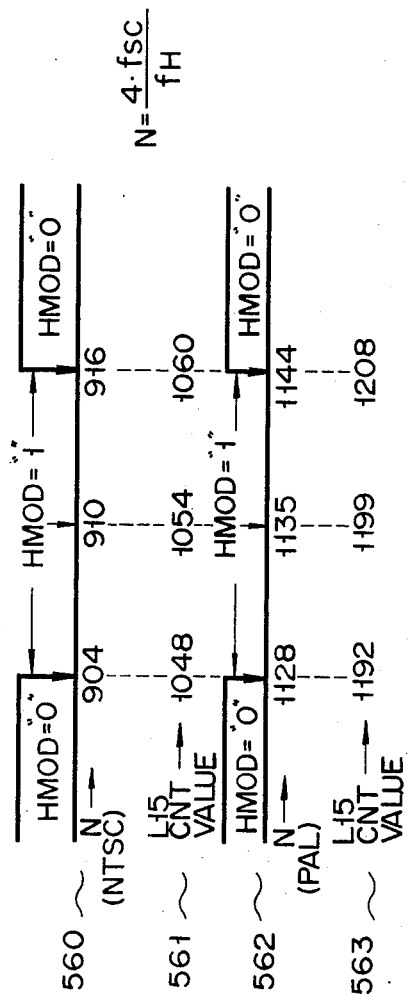
FIG. 19
FIG. 20

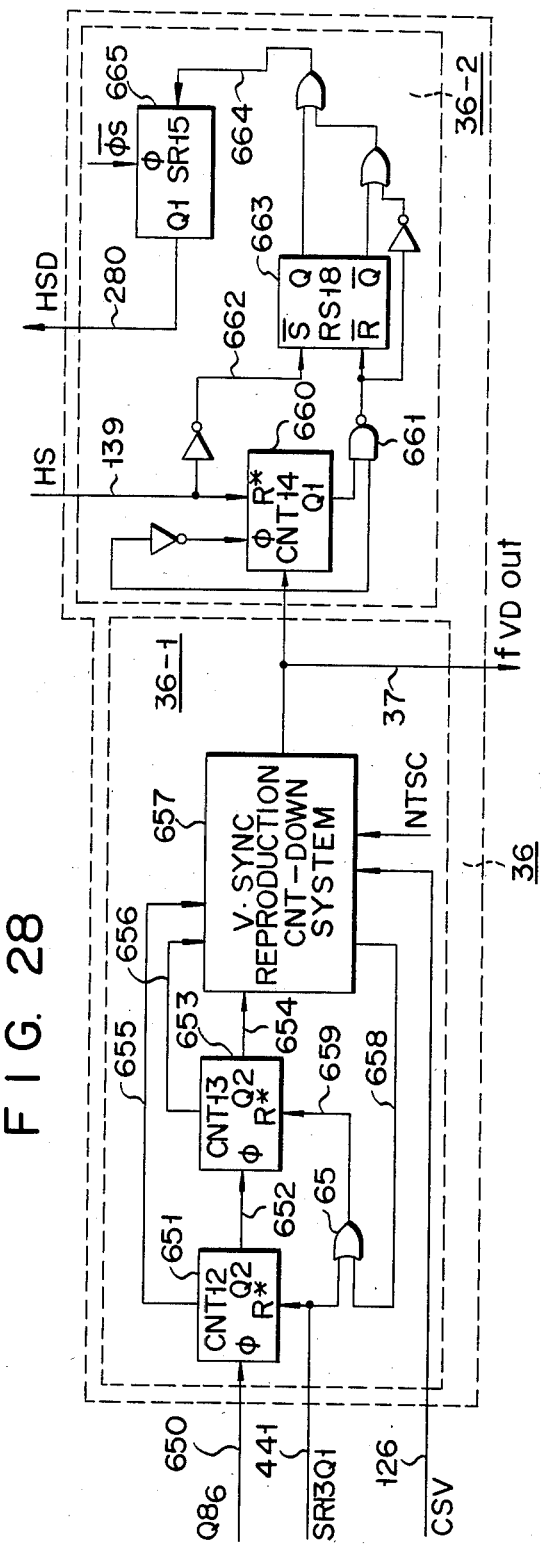
FIG. 28
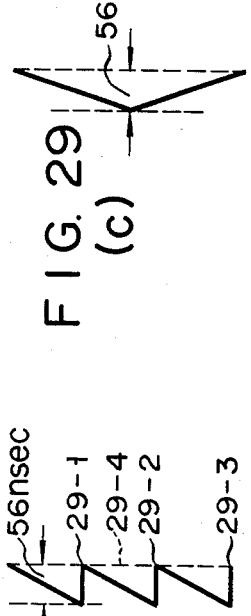
FIG. 29 (c)
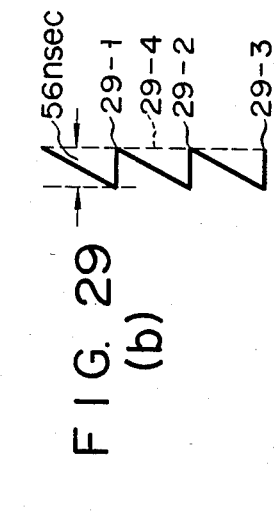
FIG. 29 (b)
FIG. 29 (a)

4,600,937

DIGITAL TELEVISION RECEIVER WITH DIGITAL SYNC/REPRODUCTION CIRCUIT

BACKGROUND OF THE INVENTION

The present invention relates to a digital television receiver for digitally processing a video signal of a base band.

Conventionally, analog signal processing has been performed in a television receiver. However, analog signal processing after the video stage has the following problem. This problem is caused by timebase processing performance which is regarded as a general drawback in analog signal processing. More particularly, cross color interference and dot interference occur on the screen due to degradation of separation between the luminance and chrominance signals, degradation of various image quality factors, and degradation of synchronization. In addition, from the economic and practical viewpoints, a hybrid configuration of electronic parts must be adapted even if an IC circuit is used, and many parts must be adjusted for a normal operation.

SUMMARY OF THE INVENTION

The present invention has been made to solve the above problems and has for its object to provide a digital television receiver for processing signals in a digital manner throughout stages from the video stage to the chrominance signal demodulation stage.

To achieve the above object, a digital television receiver has a digital conversion circuit for converting an analog video signal to a digital video signal, a process circuit for composing digital RGB signals from the digital video signal, a timing control circuit for controlling the A/D converting operation of the digital conversion circuit and the composing operation of the color process circuit.

According to the present invention, video signal processing after the analog video stage is performed in a digital manner. Therefore, stable pedestal clamping can be performed, and a stable sampling clock can be obtained having high precision. Further, digital Y-C separation can be performed, cross color interference and dot interference can be reduced, and the frequency range of the luminance and chrominance signals is increased. In addition to these advantages, stable sync reproduction signals can be obtained by the vertical and horizontal count-down circuits with high precision. Furthermore, since digital circuits are used for video signal processing and synchronization/reproduction, they are suitable for circuit-integration and require little adjustment. Therefore, a digital television receiver of the invention has an economic advantage with respect to the analog television receiver.

BRIEF DESCRIPTION OF THE DRAWINGS

The drawings show an embodiment of the present invention, in which:

FIGS. 8 to 10 are timing charts for explaining the operation of the sync separator and the horizontal sync width detector shown in FIG. 7;

FIG. 17 is a block diagram of the horizontal count-down circuit of FIG. 1;

FIG. 19 is a circuit diagram showing the detailed configuration of the horizontal standard mode detector of FIG. 17;

FIG. 20 is a view for explaining the operation of the horizontal standard mode detector shown in FIG. 19;

FIG. 28 is a circuit diagram of the vertical count-down circuit of FIG. 1;

FIGS. 29(a), 29(b), and 29(c) shows diagrams for explaining the operation of the horizontal sync reproduction circuit shown in FIG. 21.

DETAILED DESCRIPTION OF THE PREFERRED EMBODIMENT

Figure 1:
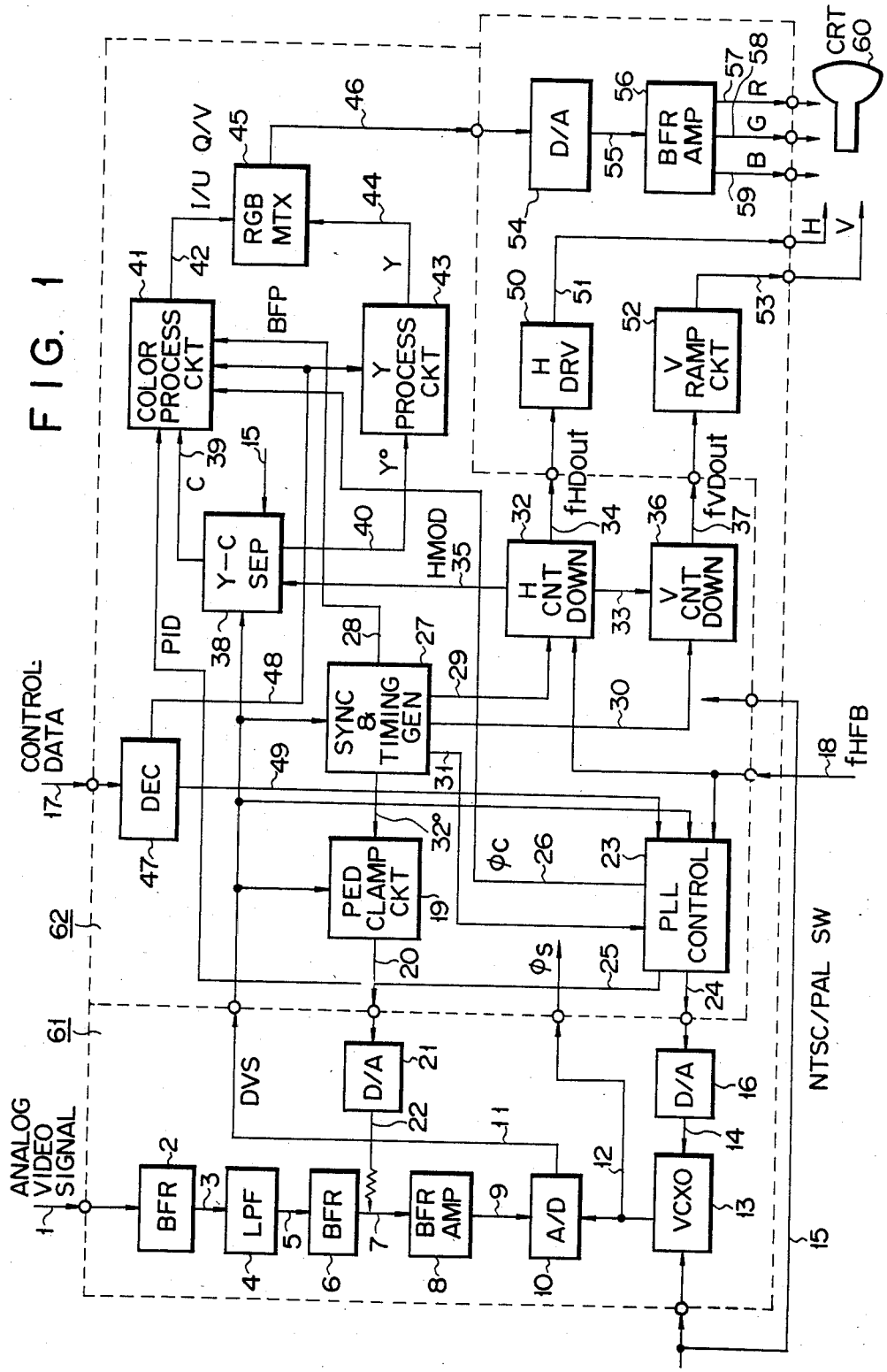
FIG. 1 is a block diagram showing the main part of a digital television receiver according to the present invention.

FIG. 1 is a block diagram showing the main part of a digital television receiver according to an embodiment of the present invention.

Referring to FIG. 1, an analog video signal 1 is AC-coupled to a buffer circuit 2. An output 3 from buffer circuit 2 is supplied to a low-pass filter (LPF) 4 for band-width limitation. The cut-off frequency of LPF 4 is 5.5 MHz for the NTSC/PAL system. An output signal 5 of LPF 4 is inputted to a buffer circuit 6. A band-limited video signal output 7 from buffer circuit 6 is supplied to a buffer amplifier 8. Buffer amplifier 8 is gain-controlled such that a signal 9 supplied to an A/D converter (A/D) 10 has a peak-to-peak value of 2 $V_{p-p}$ when analog video signal 1 having a peak-to-peak value of 1 $V_{p-p}$ is supplied. A/D 10 samples inputted signal 9 by a sampling clock ($\phi_S$) 12 and quantizes the input signal 9 to, for example, 8-bit data. A frequency fS of sampling clock ($\phi_S$) 12 is given as follows:

$$f_S = 4 f_{SC}$$

(where $f_{SC}$ is the frequency of the chrominance subcarrier)

Sampling clock ($\phi_S$) 12 is supplied to a digital circuit section 62. An 8-bit digital video signal (to be referred to as a DVS signal hereinafter) 11 synchronized with sampling clock ($\phi_S$) 12 is also supplied to digital circuit section 62. The blocks of digital circuit section 62 comprise digital circuits. DVS signal 11 is supplied to a sync detector/timing generator 27. Sync detector/timing generator 27 detects a sync pulse from DVS signal 11 and generates various timing signals 28, 29, 30, 31 and 32° in accordance with the detected sync pulses.

A pedestal clamp circuit 19 receives DVS signal 11 and timing signal 32°, and serves to reproduce the DC-components of video signal 1. Pedestal clamp circuit 19 detects the pedestal level of DVS signal 11 in accordance with timing signal 32°, and generates a control signal 20 so as to set the pedestal level at a predetermined value. Control signal 20 from clamp circuit 19 is supplied to a D/A converter (D/A) 21 and is converted to an analog signal 22. Signal 22 from D/A 21 is superposed as a clamping voltage on input signal 7 of buffer amplifier 8 through a resistor so as to control the DC level of signal 7.

DVS signal 11 and timing signal 31 is supplied to a PLL (Phase Locked Loop) control circuit 23. PLL control circuit 23 generates a digital control signal 24 in accordance with signals 11 and 31. Digital control signal 24 is supplied to a D/A 16 and is converted thereby to an analog control signal 14. Analog control signal 14 is supplied to a voltage-controlled quartz oscillator (VCXO) 13, thereby obtaining the sampling clock ($\phi_S$) 12 as an output of VCXO 13. PLL control circuit 23 serves to control the frequency and phase of sampling clock ($\phi_S$) 12. A phase-locked loop of PLL control circuit 23 is constituted by a loop containing A/D 10, sync detector/timing generator 27, PLL control circuit 23, D/A 16 and VCXO 13. In this embodiment, the phase-locked loop operates such that one of the phases of clock ($\phi_S$) 12 is aligned with the I-axis of an NTSC signal, or is aligned with the U-axis of a PAL signal. Switching data for selecting NTSC or PAL is obtained by a signal (to be referred to as an NTSC/PAL switching signal hereinafter) 15. VCXO 13 is switched by NTSC/PAL switching signal 15 so as to obtain a predetermined clock $\phi_S$. The principle of the above PLL control system is described in U.S. Pat. No. 4,291,332.

Control data 17 obtained from, e.g., a remote control receiver circuit (not shown) comprises digital data for controlling a digital television receiver. Control data 17 is decoded by a decoder 47 so as to control the circuit components of FIG. 1. The decoded control signal comprises a color saturation component and brightness/contrast control signal 48 and a hue control signal 49. Hue control signal 49 serves to shift the phase of sampling clock ($\phi_S$) 12 through the operation of PLL control circuit 23, so that the hue is controlled. A horizontal flyback signal (to be referred to as an $f_{HFB}$ signal hereinafter) 18 is supplied to PLL control circuit 23. PLL control circuit 23 then generates a known PAL ident signal (to be referred to as a PID signal) 25 when the PAL signal is received.

Timing signal 29 from sync detector/timing generator 27 is supplied to a horizontal count-down circuit 32. Horizontal count-down circuit 32 performs horizontal synchronization/reproduction according to $f_{HFB}$ signal 18 and timing signal 29, and generates a horizontal drive signal (an $f_{HD}$out signal) 34. Horizontal count-down circuit 32 determines a relationship between the sampling clock ($\phi_S$) 12 and the horizontal sync signal. When an NTSC input signal is sampled by the sampling clock $\phi_S$ ($\approx$910 $f_H$, where $f_H$ is the horizontal frequency) or when a PAL input signal is sampled by the sampling clock $\phi_S$ ($\approx$1135 $f_H$), horizontal count-down circuit 32 generates a horizontal sync standard mode (HMOD) signal 35. Timing output 30 from sync detector/timing generator 27 and an output 33 from horizontal count-down circuit 32 are supplied to a vertical count-down circuit 36. The vertical count-down circuit 36 generates a vertical sync signal ($f_{VD}$out signal) 37. The $f_{HD}$out signal 34 is amplified by a driver circuit (H driver) 50. Driver circuit 50 supplies an H deflection output 51 to a horizontal deflection system (not shown) of a CRT 60. The $f_{VD}$out signal 37 is supplied to a V ramp height circuit 52 which includes a vertical ramp generator and a vertical height control circuit. A V deflection output 53 from V ramp height circuit 52 is supplied to a vertical deflection system of CRT 60.

DVS signal 11 is supplied to a Y-C separator 38 in which a luminance signal (Y) and a chrominance signal (C) are separated from DVS signal 11. Y-C separator 38 has a separator circuit (known as a comb filter) for performing Y-C separation using vertical correlation, and a separator circuit (known as a band-pass filter) using horizontal correlation and horizontal sampled points without using vertical correlation. One of the two separator circuits is switched in response to said HMOD signal 35. More particularly, when HMOD="1", Y-C separation is performed using the comb filter. However, when HMOD="0", Y-C separation is performed using the band-pass filter. Y-C separator 38 receives NTSC/PAL switching signal 15. In Y-C separator 38, a one-horizontal delay (which is known as a 1-H delay) is alternatively switched in response to NTSC/PAL switching signal 15. This delay corresponds to 910 bits in the NTSC system and to 1135 bits in the PAL system.

Separated chrominance signal (C signal) 39, a pulse ($\phi_C$) 26 and a PID signal 25 for providing the reference phase of chrominance signal demodulation, said control signal 48, and a burst flag pulse BFP 28 are supplied to a chrominance signal processing circuit 41. Chrominance signal processing circuit 41 comprises an automatic color saturation control (ACC) circuit, a color killer circuit, and a demodulating circuit for demodulating the chrominance signals (I and Q signals in the NTSC system; or U and V signals in the PAL system) by two-axis sync detection using signal ($\phi_C$) 26 as a reference pulse. Control signal 48 supplied to chrominance signal processing circuit 41 controls the ACC circuit so as to control the color saturation (i.e., color density). Chrominance processing circuit 41 generates an output 42 or a demodulated output I, Q or U, V.

A luminance signal (Y° signal) 40 separated by Y-C separator 38 is supplied to one input terminal of a Y processing circuit 43. Control signal 48 is supplied to the other input terminal of Y processing circuit 43 and serves to control brightness and contrast of the picture. Y processing circuit 43 comprises a brightness/contrast control circuit and a horizontal/vertical profile correction circuit and generates a controlled or corrected Y signal 44.

Demodulated chrominance signal 42 and Y signal 44 are supplied to an RGB matrix 45. RGB matrix 45 generates RGB signals 46 by a predetermined matrix operation. This RGB signals 46 are converted by a D/A 54 to analog signals 55. D/A 54 comprises three 8-bit D/A converters for the R, G and B signals, respectively. Output signals 55 from D/A 54 are supplied to a buffer amplifier 56. Buffer amplifier 56 amplifies inputted signals 55 and generates analog R, G and B outputs 57, 58 and 59, respectively. Outputs 57–59 are supplied to a three-primary color circuit (not shown) which is connected to CRT 60.

A detailed configuration of the main part of the digital television receiver will be described hereinafter.

FIG. 2 shows various elements for explaining the digital television receiver described above. It should be noted that positive logic is used in the foregoing.

Figure 2A:
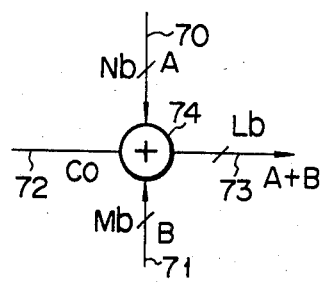
FIGS. 2(a) to 2(h) show views for explaining the denotation of the circuits used in the digital television receiver shown in FIG. 1.

FIG. 2(a) shows an adder 74. An A input 70 of N bits and a B input 71 of M bits are supplied to adder 74. Adder 74 produces an A+B output 73 of L bits. A carry input (C$_0$) 72 is added to the least significant bit of output 73 in the adder 74. As shown in FIG. 2(a), inputs each comprising a plurality of bits are designated by Nb, Mb and Lb.

Figure 2B:
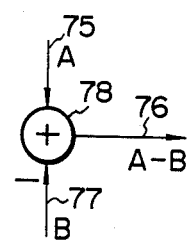

FIG. 2(b) shows a subtracter 78. An A input 75 and a negative B input 77 are added by subtracter 78 so as to produce an A-B output 76. Negative input B supplied to subtracter 78 is designated by a minus sign.

Figure 2C:
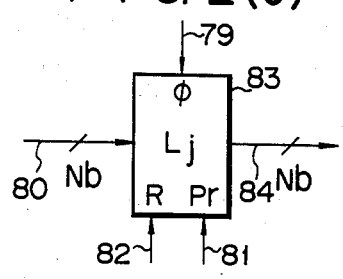

FIG. 2(c) shows an N-bit latch circuit 83. An input 80 to be latched is supplied to latch 83 and is latched at the leading edge of a clock 79. The latched signal 80 then becomes an output 84. A signal 82 is inputted to a reset terminal R of latch 83. When signal is set at logic lever "1", all bits of output 84 become "0". A signal 81 is an input to a preset terminal Pr of latch 83. When signal 81 is set at logic level "1", all bits of output 84 become "1".

Figure 2D:
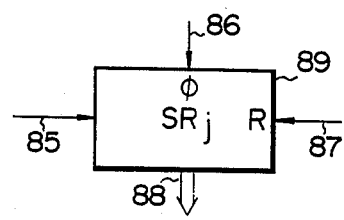

FIG. 2(d) shows a shift register 89. A signal 85 is an input to shift register 89. A signal 86 is a shift clock ($\phi$) of shift register 89, and signals 88 are outputs therefrom. A signal 87 is an input to a reset terminal R of shift register 89. When the signal 87 is set at logic level "1", signals 88 therefrom are all "0".

Figure 2E:
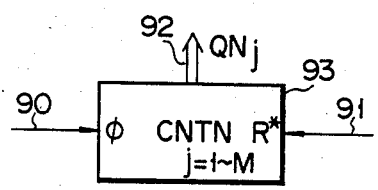

FIG. 2(e) shows a synchronous M-bit counter 93. An input clock ($\phi$) to counter 93 is designated by reference numeral 90, as clock sync reset signal (R) is designated by reference numeral 91, and outputs therefrom are designated by reference numeral 92. Reference symbol N denotes a count number, and reference symbols j=1 to M denote 1 to M stages. An asynchronous reset terminal which receives the clock 90 is designated by R*.

Figure 2F:
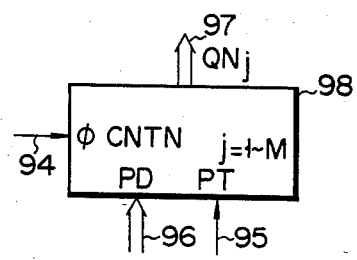

FIG. 2(f) shows a clock synchronous presettable counter. Reference numeral 96 denotes a preset input data, and 95 denotes a preset timing input signal.

Figure 2G:
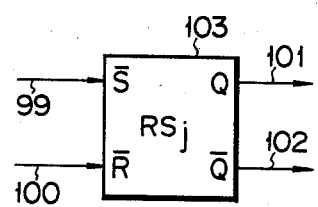

FIG. 2(g) shows a set-reset (RS) flip-flop 103. When an $\overline{S}$ terminal input 99 is set at logic level "0", a Q output 101 is set at logic level "1".

Figure 2H:
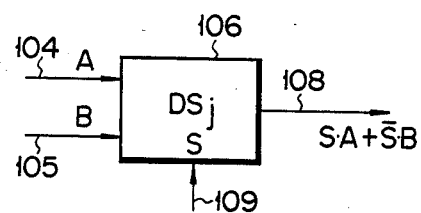

FIG. 2(h) shows a data selector 106. One of A input 104 and B input 105 is selected as an output 108 in accordance with a selection signal (S) 109. Output 108 has a combination of logic product and sum, namely S·A+$\overline{S}$B. When S="1", output 108 corresponds to A input 104. However, when S="0", output 108 corresponds to B input 105.

In the following description, when the count of a plurality of stages is expressed in units of clocks, then the count data "000...000" is regarded as 0, the count data "000...001" is regarded as 1, and the count data "00...011" is regarded as 3 provided that the counter output data is defined as "$Q_N, Q_{N-1}, \ldots, Q_3, Q_2$ and $Q_1$" from the most significant bit to the least significant bit.

(Synchronization Detector/Timing Generator)

Referring to FIG. 1, when output 22 from D/A 21 is set at 0 V, an analog video signal having a DC clamping voltage of 0 V appears at the output 7 of buffer 6. When the DC clamping voltage is set at 0 V, and a signal having a smallest APL (average picture level) is supplied as the analog video signal 1, buffer circuit 2, LPF 4, buffer 6 and buffer amplifier 8 shown in FIG. 1 are adjusted such that the input of A/D 10 has a waveform 3-3 as shown in FIG. 3 with respect to a dynamic range from 3-1 to 3-2 of A/D 10.

Figure 3:
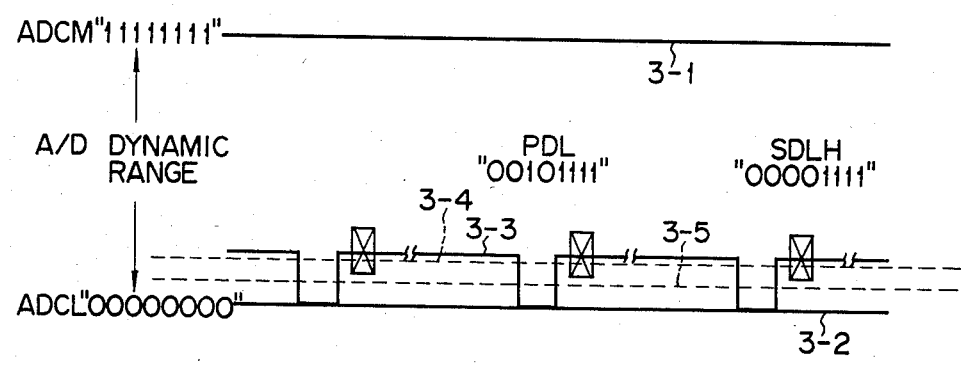
FIGS. 3 and 4 illustrate waveforms showing a dynamic range of the A/D conversion and the video signal so as to explain the operation of the embodiment.

Referring to FIG. 3, a pedestal level (PDL) 3-4 is set at "00101111", and a horizontal sync signal separation level (SDLH) 3-5 is set at "00001111" which is about half of the pedestal level (PDL) 3-4. According to the operation of a control loop for pedestal clamping of the embodiment, the pedestal level of input video signal 1 is clamped to the pedestal level (PDL) 3-4, and a clamp circuit for this operation will be described later in detail.

Figure 4:
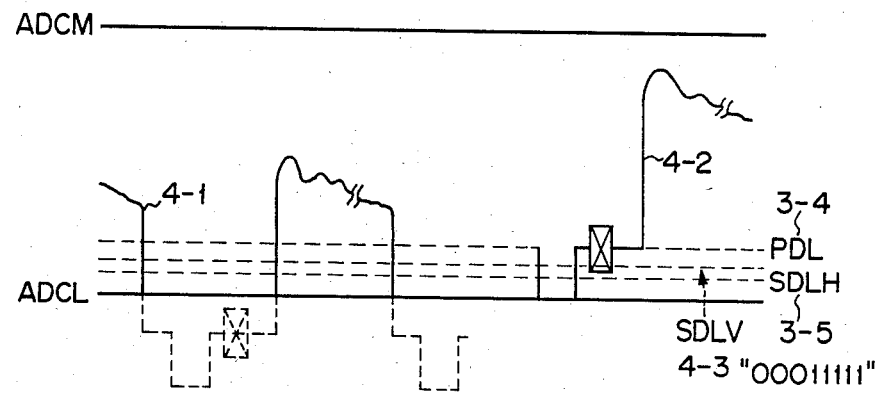

FIG. 4 shows waveforms of a signal 4-1 having a pedestal clamp voltage (0 V) and of a normally clamped signal 4-2. A level (SDLV) 4-3 in FIG. 4 shows a vertical sync signal separation level and comes closer to the level (PDL) 3-4 than the level (SDLH) 3-5 so as to properly reproduce the vertical sync signal regardless of disturbance such as ghosting. In this case, the level (SDLV) 4-3 is set to "00011111". Digital video signal (DVS) 11 which is pedestal-clamped is supplied to sync detector/timing generator 27.

Figure 6:
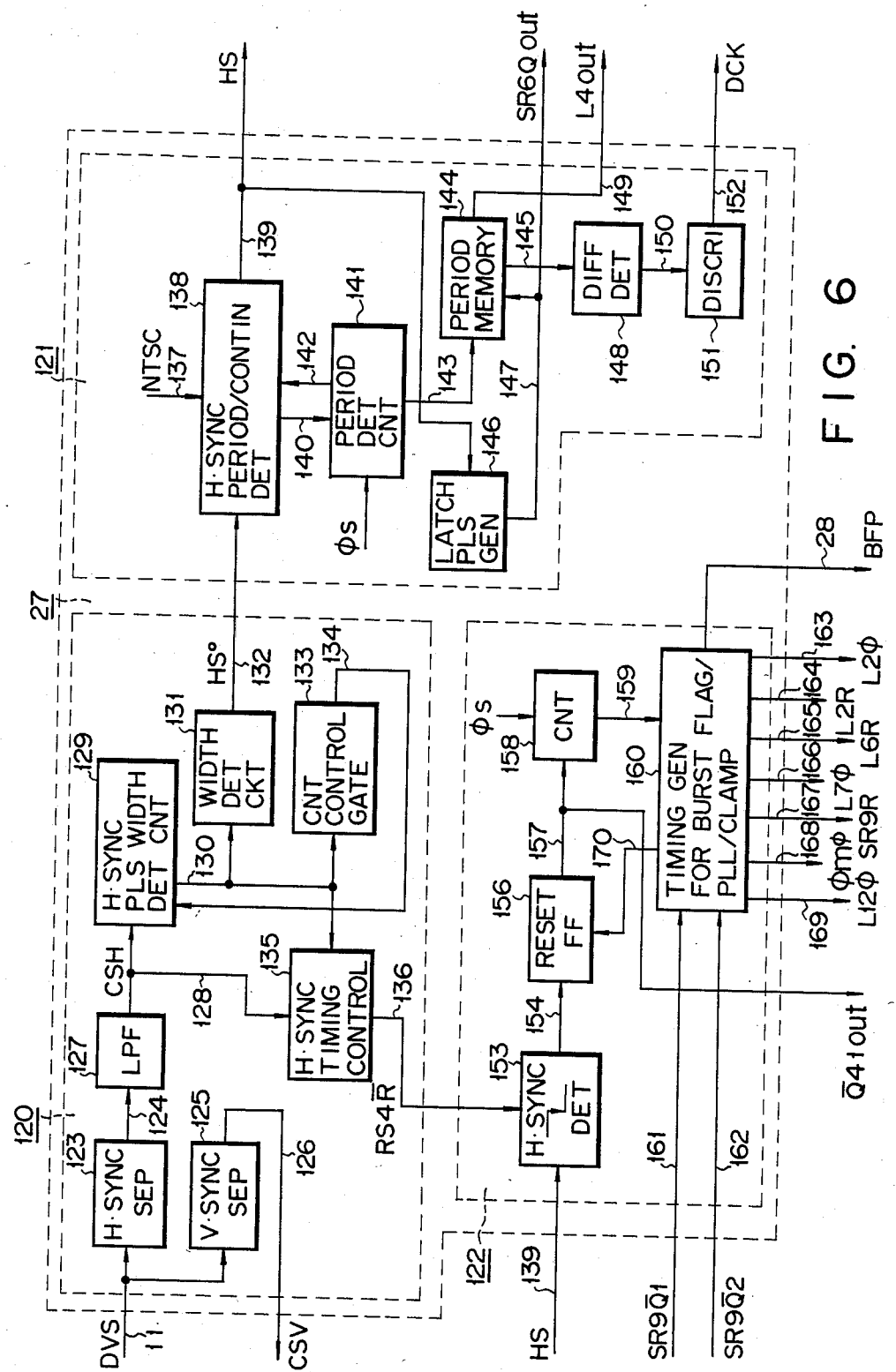
FIG. 6 is a block diagram of a sync detector/timing generator of FIG. 1.

FIG. 6 shows a detailed configuration of sync detector/timing generator 27. Sync detector/timing generator 27 comprises mainly a sync separation/horizontal sync pulse width detection circuit 120 and a timing generator 122.

DVS signal 11 is supplied to a horizontal sync separator 123 and a vertical sync separator 125 for separating horizontal and vertical sync signals, respectively. As a result of operation of separators 123 and 125, a sync separation signal 124 and a CSV signal 126 are separated from DVS signal 11. Sync separation signal 124 is supplied to an LPF 127 for filtering a high-frequency component (i.e., a chrominance frequency component of signal 124). An output 128 from LPF 127 or a composite sync signal (CSH) is supplied to a horizontal sync pulse width detecting counter 129. An output 130 from counter 129 is supplied to a width detector 131. When the counter of counter 129 has reached a predetermined value (i.e., when the horizontal sync signal has a predetermined pulse width), a first horizontal sync detection signal (H$_S$° signal) 132 is produced from width detector 131. A width detecting counter control gate 133 receives output 130 from counter 129 and controls counter 129 in a manner that counter 129 is not responsive to CSH signal 128 for a predetermined interval when HS° signal 132 is produced by width detector 131.

In this manner, control gate 133 serves to prevent erroneous horizontal synchronization due to a signal distortion of CSH signal 128 upon reception of a high-intensity ghost signal. CSH signal 128 and output 130 from counter 129 are supplied to a horizontal sync timing control circuit 135 which controls the fall timing of CSH signal 128. Horizontal sync timing control circuit 135 generates a signal (RS4$\overline{\text{R}}$) 136 for disenabling a timing generator 122 from generating a burst flag pulse and various timing signals such as PLL and clamping timing pulses when CSH signal 128 does not fall within a predetermined time interval. In this manner, a PLL is formed and clamping is performed only when a CSH signal 128 which satisfies the predetermined conditions is received. Accordingly, a PLL circuit and a clamp circuit which are stable against disturbance can be obtained.

A horizontal sync periodicity/continuity detector 138 detects the periodicity and continuity of the horizontal sync signal (actually, the H$_S$° signal) 132 and generates a second horizontal sync detection signal (H$_S$ signal) 139 only when H$_S$° signal 132 has a predetermined periodicity and continuity. A period detection counter 141 comprises an 11-stage counter for counting clock $\phi_S$ as the reference clock. An 11-bit output 143 therefrom is supplied to a period memory 144 which can store a two-period count of counter 144. When H$_S$ signal 139 having the predetermined period and continuity is generated from horizontal sync periodicity/continuity detector 138, an SR6Q$_1$out signal 147 is generated from a latch pulse generator 146. The output 143 from the counter 141 is stored in the period memory 144. A difference detector 148 detects a difference between the two periods whose data is stored in the period memory 144. A discriminator 151 generates a discrimination signal (DCK signal) 152 when an output 150 from the difference detector 148 falls within a predetermined range.

In timing generator 122, a horizontal sync trailing edge detector 153 detects the negative-going zero-crossing point of the horizontal sync signal in accordance with H$_S$ signal 139 and RS4$\overline{\text{R}}$ signal 136, and generates a trigger pulse 154. Trigger pulse 154 is applied to a counter reset flip-flop 156. Then, flip-flop 156 generates a reset signal 157, thereby starting a counter 158. Counter 158 comprises a 6-stage counter. Various timing signals 163 to 169 and the burst flag pulse (BFP) 28 are generated from a burst flag/PLL/clamp timing generator 160 in accordance with an output 159 from counter 158, and SR9$\overline{\text{Q}}_1$ and SR9$\overline{\text{Q}}_2$ signals 161 and 162, respectively, from the PLL control circuit to be described in detail later.

Figure 7:
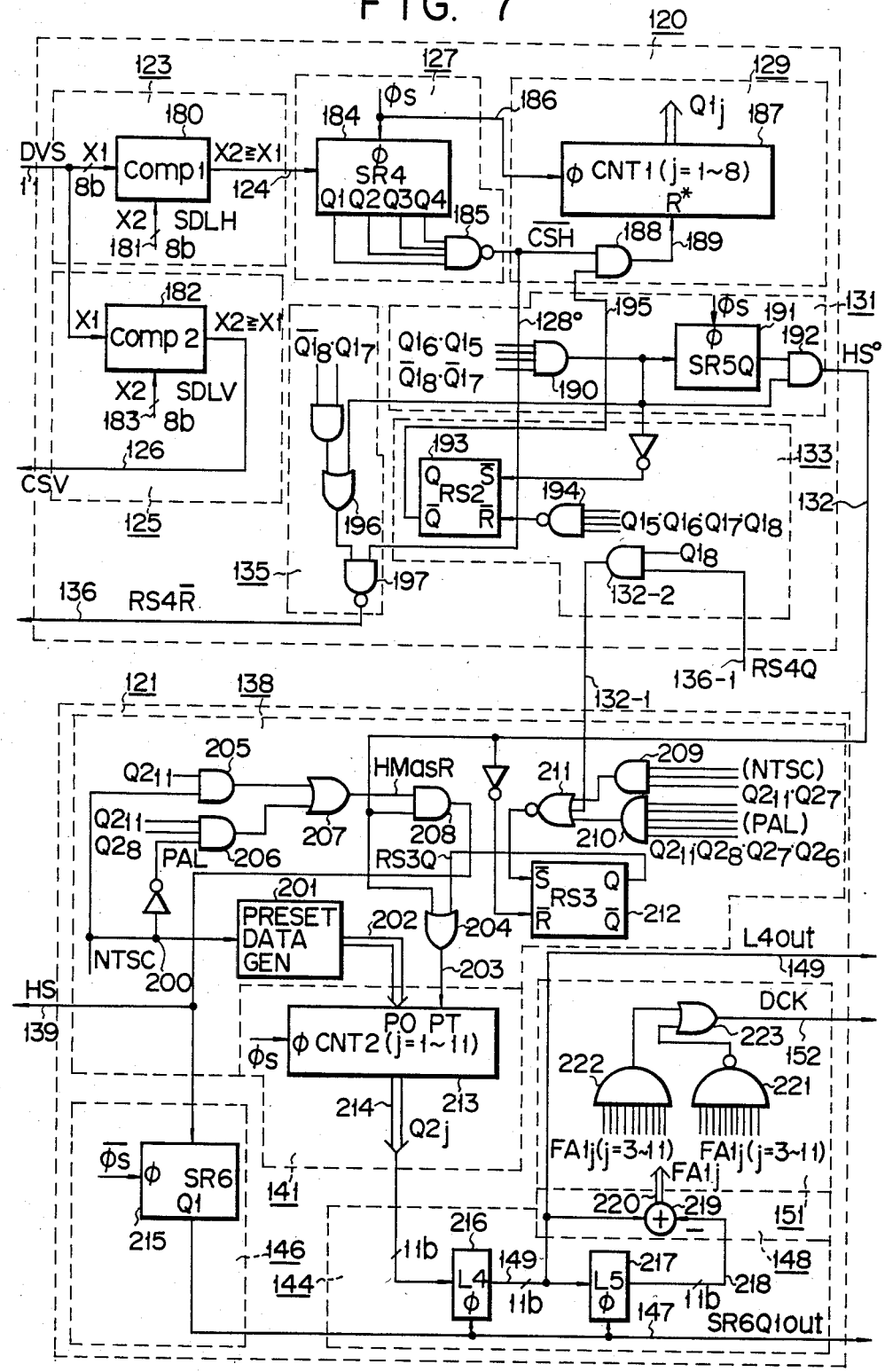
FIG. 7 is a circuit diagram showing the detailed configuration of the sync separator and horizontal sync width detector of FIG. 6.

Sync detector/timing generator 27 shown in FIG. 6 will be described in detail. FIG. 7 is a circuit diagram of sync separation/horizontal sync width detector 120 and horizontal sync periodicity/continuity detector 121 shown in FIG. 6.

Referring to FIG. 7, DVS signal 11 is supplied as an X$_1$ input to a comparator (Comp 1) 180 constituting horizontal sync separator 123. The X$_1$ input is then compared by comparator 180 with a horizontal sync separation level (SDLH) 181 as an X$_2$ input. When X$_2 \geq$ X$_1$, sync separation signal 124 is obtained. Similarly, vertical sync separation signal (CSV) 126 is obtained from a comparator (Comp 2) 182 constituting a vertical sync separator 125, when X$_2$(SDLV)$\geq$X$_1$. The horizontal and vertical sync separation levels (SDLH) 181 and (SDLV) 183 are SDLH="00001111" and SDLV="00011111", respectively, as described with reference to FIGS. 3 and 4. Each of comparators 180 and 182 may comprise a single simpling gate. Output 124 from comparator 180 is supplied to a 4-stage shift register 184. A shift clock of shift register 184 is $\phi_S$. The bits of the output from shift register 184 are supplied to 4-input NAND gate 185. The NAND gate 185 produces a signal $\overline{\text{CSH}}$ (inverted signal of signal CSH) as its output 128°. Shift register 184 and gate 185 constitute LPF 127 for eliminating a chrominance component having a frequency of f$_{SC}$ or less.

Figure 8:
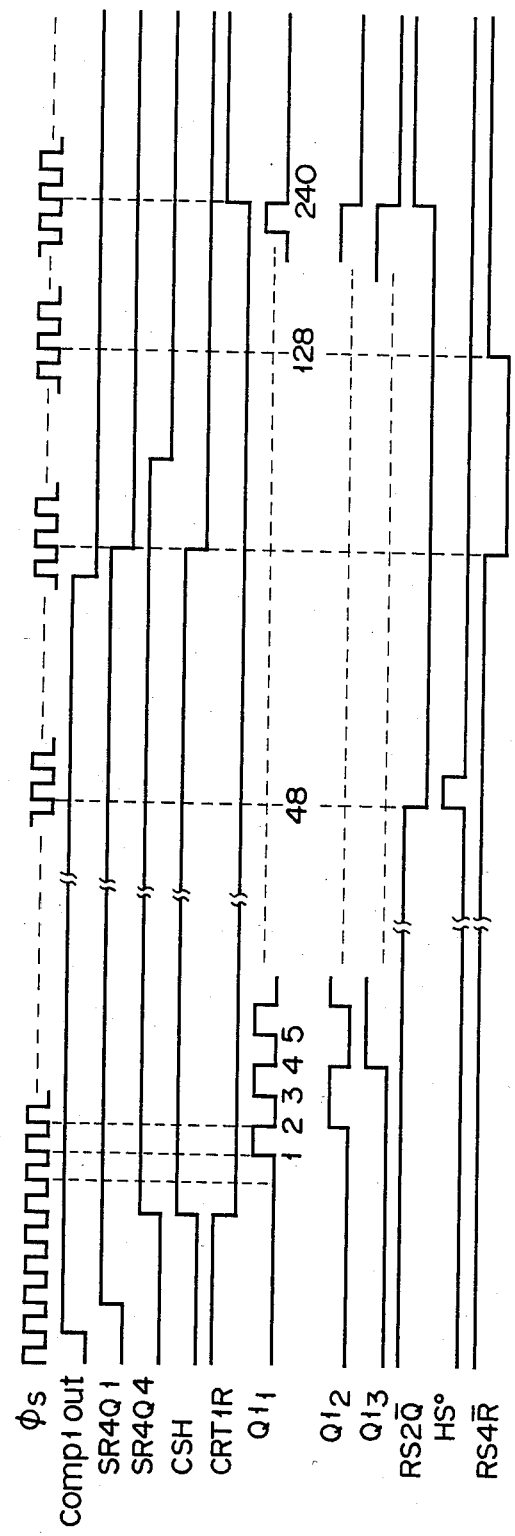

In the configuration of counter 129, width detector 131, gate 133 and horizontal sync timing control circuit 134, when CSH="1", a counter 187 starts to count the clock ($\phi_S$) 186. The count operation of counter 187 is illustrated in the timing chart of FIG. 8. An output from an AND gate 190 corresponding to a count "48" of counter 187 is supplied to a shift register 191. The width detected pulse (H$_S$°) 132 is obtained through an AND gate 192. When H$_S$° signal 132 is obtained, an RS flip-flop 193 is set, and a $\overline{\text{Q}}$ output 195 therefrom is supplied through a gate 188. Then, a reset signal 189 supplied from gate 188 to counter 187 is forcibly set at logic level "0".

An OR gate 196 serves to obtain a horizontal sync timing control output. OR gate 196 produces a signal of logic level "1" while a count of counter 187 falls within a range between "48" and "128". When CSH signal 128 falls while the output from the gate 196 is set at logic level "1" (the $\overline{\text{CSH}}$ signal 128° rises), a waveform indicated by RS4$\overline{\text{R}}$ in FIG. 8 appears at the output 136 of a NAND gate 197. It is understood that the trailing edge of RS4$\overline{\text{R}}$ signal 136 allows falling of the CSH signal. A NAND gate 194 serves to invert the $\overline{\text{Q}}$ output 195 of flip-flop 191 when the count of counter 187 is set to "239". As a result, after H$_S$° signal 132 is produced, counter 187 does not receive the CSH signal during a time interval corresponding to a count "192" (="240"−"48"). An AND gate 132-2 produces a logic output 132-1 from Q1$_8$ and RS4Q (to be described later).

H$_S$° signal 132 is supplied to horizontal sync periodicity/continuity detector 121. Before detector 121 is described in detail, the range of horizontal signal waveforms of an NTSC/PAL input signal to the digital television receiver, and the operation of the period detection counter 141 will be described.

The NTSC signal defined in the broadcast waves has a frequency 4f$_{SC}$(=910f$_H$ or 14.3 MHz) where f$_H$ is the horizontal sync pulse frequency and f$_{SC}$ is the chrominance subcarrier frequency.

On the other hand, a signal having a frequency (4f$_{SC}\neq$910f$_H$ is included in part of a color bar signal generator and a video game. In other words, there exists a signal which is not associated with the chrominance carrier frequency f$_{SC}$ and the horizontal frequency f$_H$. Now assume that a range of the horizontal frequency is given as f$_H$=15.73±0.5 kHz. Then, counter 187 counts sample clocks $\phi_S$ from "880" to "944" (=4f$_{SC}$).

A PAL input signal generally has a frequency 4f$_{SC}\approx$1135 f$_H$(4f$_{SC}\approx$17.73 MHz). When the frequency f$_H$ is 15.625 kHz±0.5 kHz, the number of pulses $\phi_S$ to be counted during one horizontal scanning period falls within a range between "1099" and "1173". Period detection of the horizontal sync signal must cover the range of the horizontal sync frequency. For this purpose, the period detection counter 141 (or 213) show in FIG. 7 comprises an 11-stage counter having the pulse $\phi_S$ as a reference pulse and performing a count operation for 1H period. When $H_S$ signal is supplied to counter 213, counter 213 is preset at a count "144" in the NTSC mode and at a count "64" in the PAL mode, thereby providing a proper timing for period detection. At the same time, by this presetting, the circuit arrangement of horizontal count-down circuit 32 in FIG. 1 can be simplified.

FIG. 9 shows relationships among $H_S°$ signal 132, a gate signal ($HM_{as}R$) indicating a range corresponding to the horizontal period, and a count 214 of counter 213. As shown in FIG. 9, only $H_S°$ signal 132 having the predetermined periodicity and continuity is obtained from an AND gate 208 (FIG. 7) as a horizontal sync detection signal $H_S$ having logic AND value of $H_S°·HM_{as}R$. Reference symbol $SR6Q_1$ denotes an output from a shift register 215 for storing the $H_S$ and $\overline{\phi}_S$ signals as shift clocks. Reference numerals 9-1 and 9-2 in FIG. 9 denote the count states upon reception of NTSC and PAL input signals, respectively.

FIG. 10 is a timing chart for detecting the periodicity and continuity of $H_S°$ signal 132. The $HM_{as}R$ signal rises when the count of counter 213 is "1024" as shown by reference numeral 10-1 upon reception of the NTSC input signal. The $HM_{as}R$ signal falls in synchronism with falling of $H_S°$ signal 132. Furthermore, when $H_S°$ signal 132 is dropped out as shown by reference numeral 10-3, the $HM_{as}R$ signal falls when a count of counter 213 is "1088". In this case, counter 213 is held preset at a count "144" and awaits next $H_S°$ signal 132. When $H_S°$ signal 132 is supplied again as indicated by reference numeral 10-4, $H_S$ signal 139 is obtained from the $H_S°$ signal 132 as indicated by reference numeral 10-5. The operation upon reception of the PAL input signal is substantially the same as that described above. As shown in FIG. 10, it is readily understood that the horizontal sync detected signal $H_S$ has a strong resistance to disturbance.

Referring to FIG. 7, the $HM_{as}R$ signal is produced as an output from an OR gate 207. $H_S$ signal 139 is obtained from an AND gate 208 as an logical AND of $HM_{as}R$ and $H_S°$ signals. An RS flip-flop 212 is reset in response to an inverted signal of $H_S°$ signal 132 and is set in response to the output from a NOR gate 211. RS flip-flop 212 produces a control signal (RS3Q in FIG. 10) as its Q output when $H_S°$ signal 132 is dropped out. Q output RS3Q and $H_S°$ signal 132 are inputted to an OR gate 204. A preset input signal to counter 213 is obtained as an output 203 from OR gate 204. A preset data generator 201 controlled by the NTSC signal generates digital data "00010010000" corresponding to the count "144" upon reception of the NTSC signal and generates digital data "00001000000" corresponding to the count "64" upon reception of the PAL signal. Generator 201 supplies the generated digital data to counter 213 as the preset data.

$H_S$ signal 139 is supplied to shift register 215. A $Q_1$ output from shift register 215 is used as a timing signal so as to latch an 11-bit output 214 from counter 213 to a latch 216. An output 149 from latch 216 is supplied to a latch 217. Latches 216 and 217 constitute horizontal period memory 144 which stores two-period data from the counter 213. A subtracter 219 serves as difference detector 148 (FIG. 6) for detecting a difference between the outputs from latches 216 and 217. A difference output 220 ($FAI_j$) is discriminated by discriminator 151 (FIG. 6).

In discriminator 151, the upper 9 bits (j=3-11) of the 11-bit data of difference output 220 are supplied to a NAND gate 221 and an AND gate 222. Output signals from gates 221 and 222 are supplied to an OR gate 223 to obtain a DCK signal 152. In fine, when a difference between an output 149 from latch 216 and an output 218 from latch 217 falls within a range of ±3, DCK signal 152 becomes "1". The $H_S$ signal 139, the output 149 from latch 216, the DCK signal 152 and the output from shift register 215 are supplied to horizontal count-down circuit 32 shown in FIG. 1.

Figure 11:
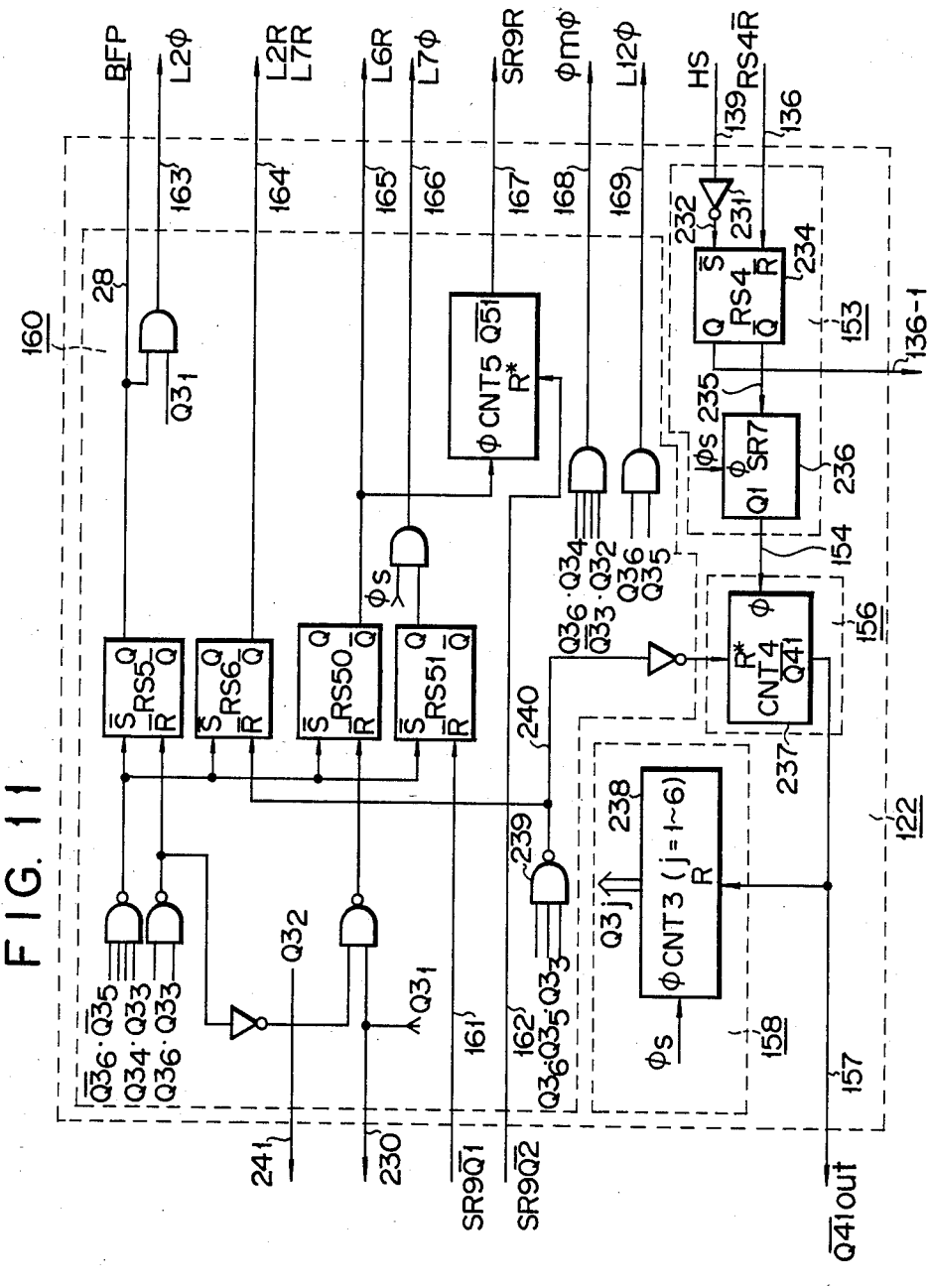
FIG. 11 is a circuit diagram showing the detailed configuration of the burst flag/PLL/clamp timing generator of FIG. 6.

FIG. 11 is a circuit diagram showing a detailed configuration of burst flag/PLL/clamp timing generator 122 shown in FIG. 6. An inverted signal 232 of $H_S$ signal 139 from detector 138 (FIG. 6) is supplied to an RS flip-flop 234 which is then set. $RS4\overline{R}$ signal 136 from timing control circuit 135 (FIG. 6) is supplied to RS flip-flop 234 which is then reset. A $\overline{Q}$ output 235 of the RS flip-flop 234 rises in sychronism with falling (trailing edge) of the horizontal sync signal and is supplied to a shift register 236. A $\overline{Q}_1$ output 154 from the shift register 236 is supplied to a single stage counter (flip-flop) 237. When $Q_1$ output 154 from the shift register 236 goes from logic level "0" to logic level "1", a $\overline{Q}_{41}$ output 157 from a counter 237 goes to logic level "0", thereby releasing the reset state of a counter 238. Counter 238 is then started to count the $\phi_S$. Counter 238 comprises a 6-stage counter which is self-reset in response to the logical AND of outputs $Q_{36}$, $Q_{35}$ and $Q_{33}$ obtained from a NAND gate 239.

Figure 12:
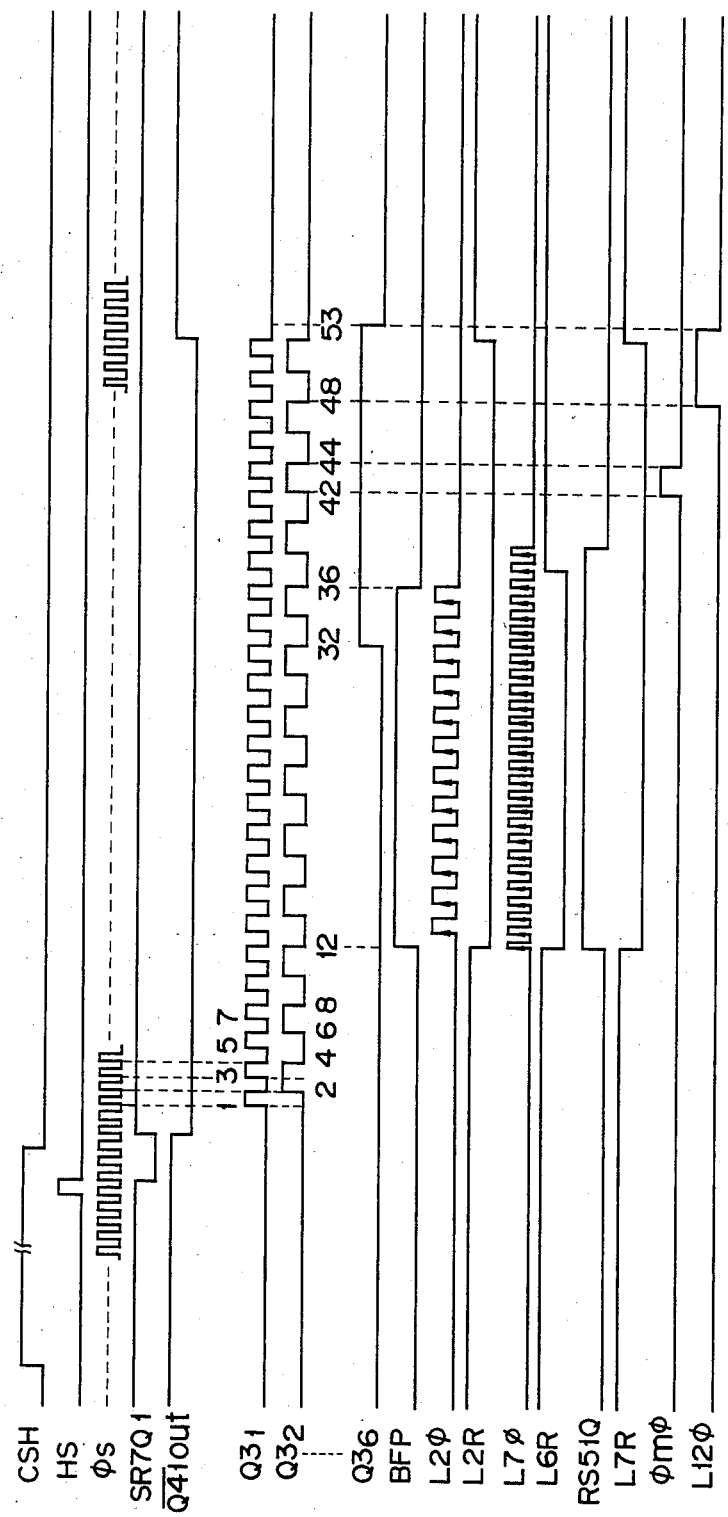
FIG. 12 is a timing chart for explaining the operation of the burst flag/PLL/clamp timing generator shown in FIG. 11.

The operation of timing generator 160 is shown in FIG. 12. More particularly, FIG. 12 shows the count of counter 238 and various timing signals in relation to a CSH signal (which is obtained by inverting the output of NAND gate 185 of FIG. 7), $H_S$ signal 139, clock $\phi_S$, $Q_1$ output 154 from shift register 236, $Q_{41}$ output 157 from counter 237, and outputs $Q3_1$, $Q3_2$, ..., $Q3_6$ from counter 238. These timing signals designated by reference numerals 28, 163, 164, 165, 166, 167, 168, 169, 157, 230, 161 and 162 will be described in detail with reference to the clamp circuit 19 and the PLL control circuit 23.

(Pedestal Clamp Circuit)

Pedestal clamp circuit 19 shown in FIG. 1 serves to clamp the pedestal level of DVS signal 11 to the level 3-4 (PDL) or "00101111", as seen from the waveform indicated by reference numeral 4-2 in FIG. 4.

Figure 13:
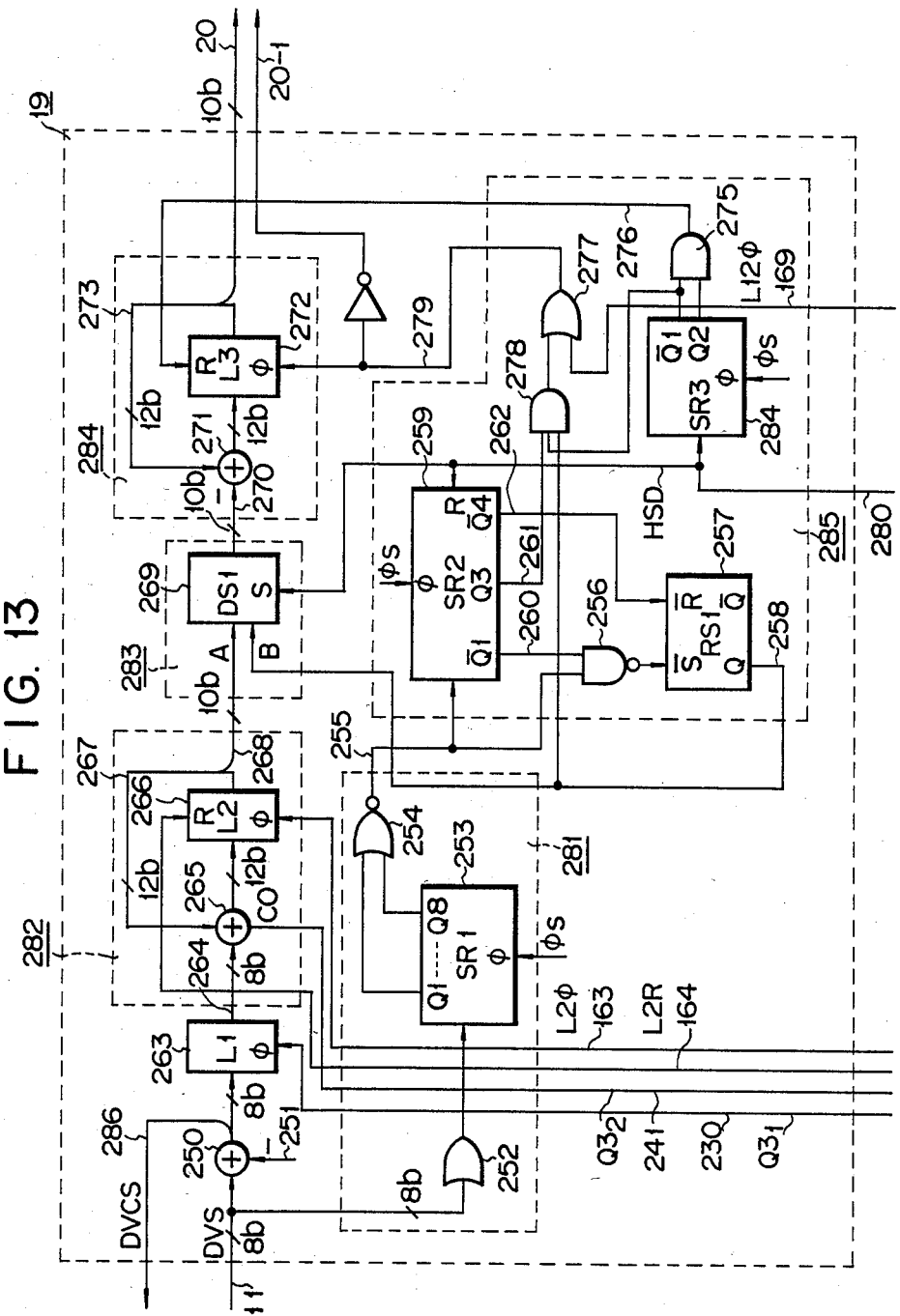
FIG. 13 is a circuit diagram showing the detailed configuration of the digital pedestal clamp circuit of FIG. 1.

FIG. 13 is a circuit diagram showing the detailed configuration of pedestal clamp circuit 19. Referring to FIG. 13, an HSD signal 280 is set at logic level "1" which indicates sync detection when $H_S$ signal 139 is obtained. HSD signal 280 is supplied to a sync detection discriminator 285. When HSD="0" (i.e., when sync detection is not performed), timing data (e.g., BFP 28 from timing generator 27 in FIG. 1) indicating the pedestal clamp timing is not obtained. A sync signal portion must first be separated. For this purpose, when HSD signal 280 goes from logic level "1" to logic level "0", a shift register 284 detects the trailing edge of HSD signal 280. A detection signal 276 outputted from a gate 275 is supplied to reset a latch 272 for storing a digital clamping voltage. When outputs 20 from latch 272 are all "0", the clamping voltage (the output 22 from D/A 21 in FIG. 1) becomes 0 V. As a result, the clamp control system returns to the initial state.

In general, when a video signal input exists, the relationship between the signal and the dynamic range of the A/D converter at the time of initial setting is indicated by reference numeral 4-1 in FIG. 4. DVS signal 11 of an 8-bit signal is logic-ORed by an OR gate 252 shown in FIG. 13, and an output therefrom is set at logic level "0" only when input signal 9 is supplied to A/D 10 such that an input signal waveform crosses a lower level (corresponding to the least significant bit LSB) of a dynamic range of A/D 10 (i.e., only when the contents of DVS signal 11 are all "0"). An output from gate 252 is supplied to an 8-stage shift register 253. A NOR gate 254 for receiving all outputs from shift register 253 produces an output 255 having logic level "1" which corresponds to a signal obtained by filtering the output from gate 252 through LPF. Gate 252, shift register 253 and gate 254 constitute a level detector 281 for DVS signal 11. The leading edge of output signal 255 from detector 281 is detected by a NAND gate 256 so as to set an RS flip-flop 257. A Q output 258 from RS flip-flop 257 is supplied to a B input of a 10-bit data selector 269. It should be noted that a B data input to the data selector 269 is decoded from the most significant bit MSB as "1111111000" by an encoder (not shown). A 10-bit output 270 from data selector 269 and a 12-bit output 273 from latch 272 are supplied to a subtracter 271 and a difference signal is obtained from subtracter 271 while making the LSBs of the signals 270 and 273 coincide with each other. This difference signal is then loaded in latch 272 in synchronism with the output timing of a Q₃ output 261 from a shift register 259 (i.e., it is loaded in latch 272 when an AND gate 278 produces the output).

When the above operation is repeated, the clamp level is raised to obtain $H_S$ signal 139. When $H_S$ signal 139 is obtained, HSD="1" (i.e., sync detection can be performed). When HSD="1", an A signal 268 is obtained as output signal 270 from data selector 269 which constitutes switching circuit 283, thereby setting the digital television receiver in a pedestal clamp mode. DVS signal 11 is subtracted by a subtracter 250 by a signal 251 or "00101111" (PDL). A sign (Sgn) bit of the output from subtracter 250 is supplied as a DVCS signal 286 to PLL control circuit 23 to be described later. Furthermore, the 8-bit output from subtracter 250 which includes the Sgn bit is supplied to a latch 263. This 8-bit output is sampled by a Q3₁ output 230 which is generated by counter 238 (FIG. 11) and which has a $\phi_S/2$ frequency (FIG. 12).

An adder 265 and a latch 266 constitute a digital integrator 282. The number of integration operations is determined by a $\phi$ input 163 to latch 266. Since color burst period integration is performed as shown in FIG. 12, the integration operations are performed 12 times. The 10-bit output 268 obtained by omitting two lower bits of output 267 from latch 266 is supplied to the A input of data selector 269.

A C₀ input to adder 265 becomes a warbling signal since the adder 265 receives a Q3₂ output 241 from counter 238 (FIG. 11), thereby improving clamping precision. When 12 times integration operations are completed, latch 266 is reset in response to an L₂R signal 164 from timing generator 160.

Subtracter 271 and latch 272 also constitute an integrator 284. Integration is repeated to set the contents of input 270 applied to subtracter 271 to be all "0", thereby stabilizing the pedestal level. L₁₂$\phi$ signal 169 from timing generator 160 and the output from gate 278 are logical ORed by OR gate 277, and become a clock signal 279 to be supplied to latch 272. An inverted output 20-1 of signal 279 is used as a clock for data latch in D/A 21.

(PLL Control Circuit)

Since the principle of PLL control circuit 23 is described in U.S. Pat. No. 429,133,230, only the detailed circuit configuration and features of PLL control circuit 23 will be described hereinafter.

Figure 14:
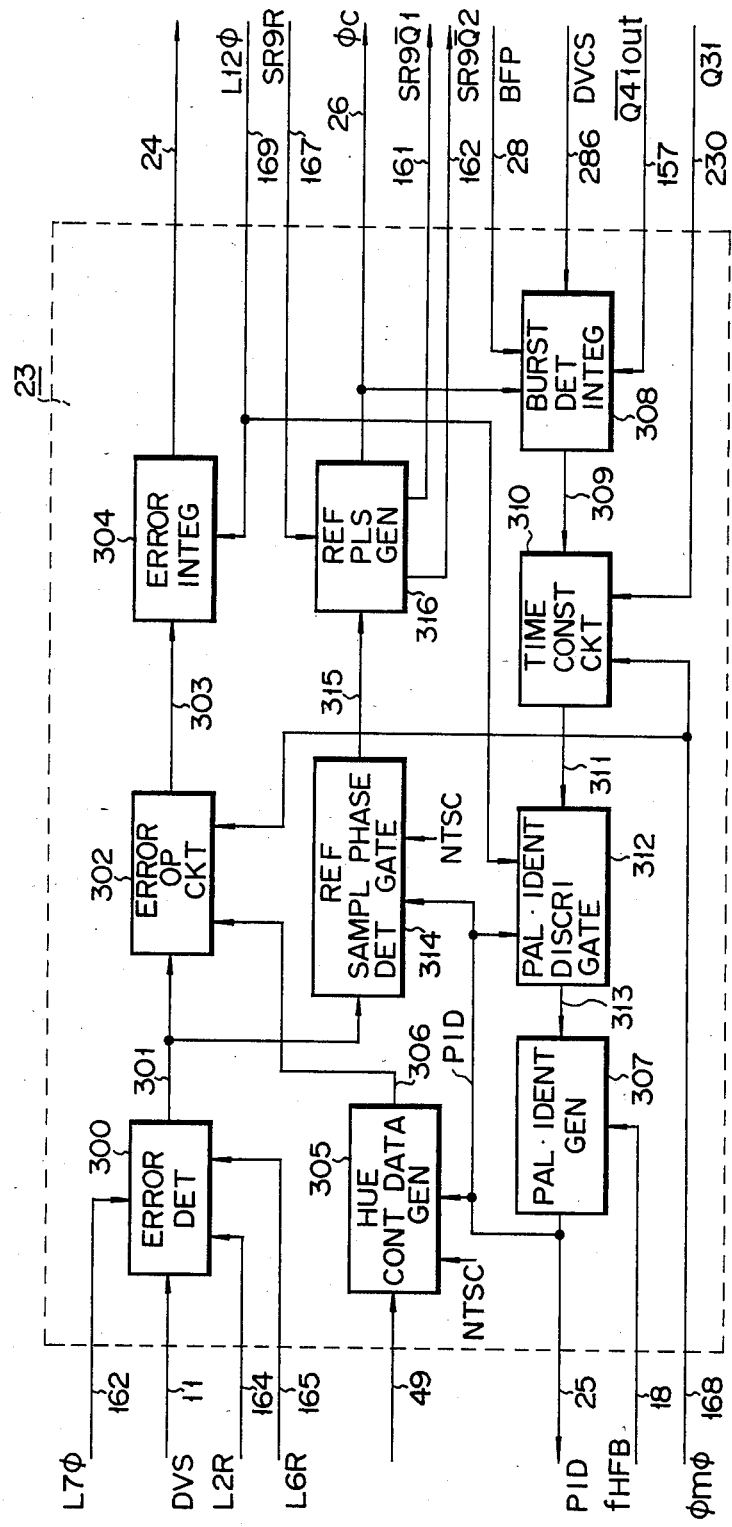
FIG. 14 is a block diagram of the PLL control circuit of FIG. 1.

FIG. 14 is a block diagram showing the overall configuration of PLL control circuit 23. An error detector 300 integrates DVS signal 11 under the control of timing signals (i.e., L₇$\phi$ signal 162, L₂R signal 164 and L₆R signal 165) as follows:

$$\sum_{j=1}^{k}(P_{4j-3}-P_{4j-1}), \sum_{j=1}^{k}(P_{4j-2}-P_{4j}) \tag{1}$$

Figure 5:
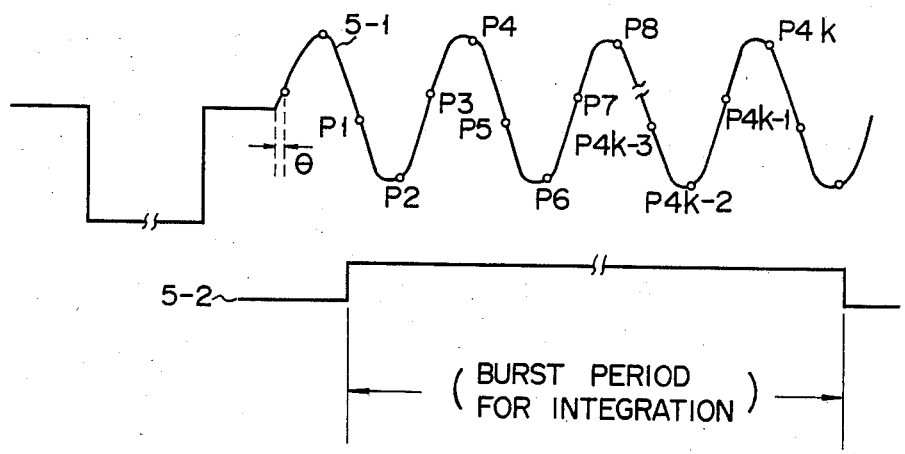
FIG. 5 shows a waveform of a burst signal in order to explain the principle of operation of the PLL control circuit.

The sampled points of $P_{4j}$ are plotted on a color burst waveform 5-1 in FIG. 5. It should be noted that reference numeral 5-2 in FIG. 5 indicates a burst period for which integration is performed, and that parameter k in equation (1) is k=6 in this embodiment. In other words, the integration operation indicated by equation (1) above is performed for every six burst periods.

If a target sampling phase for the color burst phase is given as $\theta$, as shown in FIG. 5, an error signal is given as follows:

$$E = \sum_{j=1}^{6}(P_{4j-3}-P_{4j-1}) - \sum_{j=1}^{k}(P_{4j-2}-P_{4j})\tan\theta \tag{2}$$

An error operation circuit 302 calculates the error using an output 301 from error detector 300 in accordance with equation (2). A calculated result 303 is supplied to an error integrator 304. Output 24 from error integrator 304 is supplied to D/A 16 (FIG. 1), thereby forming a PLL. When the target sampling phase $\theta$ (actually, the value of tan $\theta$) becomes variable in accordance with equation (2), an optional sampling phase can be obtained. It should be noted that the hue control can be performed by a variable tan $\theta$. When a hue control data generator 305 receives a control signal 49, it selects a value tan $\theta$ corresponding to the predetermined control data and supplies a signal 306 indicating the value tan $\theta$ to error operation circuit 302.

The integrated result (i.e., the Sgn bit of output 301 from error detector 300) is supplied to a reference sampling phase detection gate 314. A reference phase pulse 315 is prepared by gate 314 so as to give the reference sampling phase. Reference phase pulse 315 is supplied to a reference pulse generator 316 which continuously generates reference pulses. Reference pulse generator 316 then generates $\phi_C$ signal 26 as the reference pulse. $\phi_C$ signal 26 indicates the I-axis in the NTSC mode or the U-axis in the PAL mode. In the PAL mode, a PAL ident signal is also required in addition to alignment of the reference phase with the U-axis.

DVSC signal 286 of a single bit is supplied from subtracter 250 (FIG. 13) to a burst detection integrator 308 and is sampled in response to $\phi_C$ signal 26 during the six periods of the color burst signal. At the same time, the sampled result is integrated in burst detection integrator 308. An integrated result 309 is supplied to a time constant circuit 310 (equivalent to an integrator) for stabilizing the PAL ident signal. In response to an output 311 from time constant circuit 310, to PID signal 25, and to L₁₂$\phi$ signal 169 as a timing signal, a PAL ident determination gate 312 determines whether or not the PAL ident signal satisfies a predetermined condition. If it is determined that the PAL ident signal does not satisfy the predetermined condition, PAL ident determination gate 312 generates a reset signal 313. A PAL ident generator 307 comprises a single stage counter which receives $f_{HFB}$ signal 18 and reset signal 313. Reset signal 313 is supplied to a reset terminal of this single stage counter. This counter of generator 307 generates PID signal 25. The reference sampling phase is shifted by ±45° with respect to the burst phase or with respect to the U-axis in the PAL mode in accordance with PID signal 25.

Figure 15:
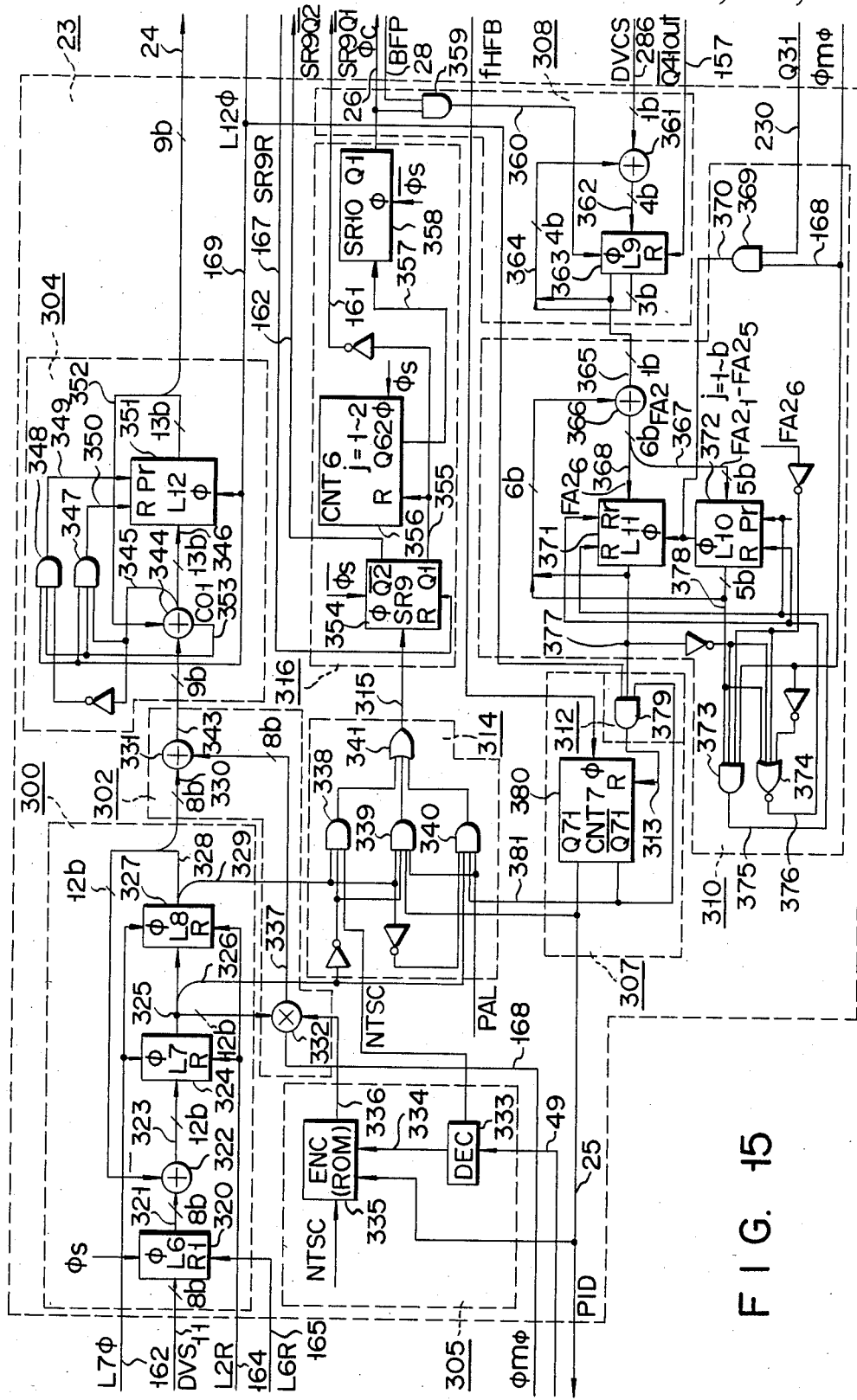
FIG. 15 is a circuit diagram showing the detailed configuration of the PLL control circuit of FIG. 14.

FIG. 15 is a circuit diagram showing the detailed configuration of PLL control circuit 23. DVS signal 11 is supplied to a latch 320. Latch 320 receives $L_6R$ signal 165 as its reset signal. An output 321 from latch 320 is supplied to a subtracter 322. An output 323 from subtracter 322 is supplied to a latch 324. An output 325 from latch 324 is supplied to a latch 327. An output 328 from latch 327 comprises 12-bit data which is then supplied to subtractive input terminal of subtracter 322. An output 330 corresponding to 8-bit data (the 8 more significant bits) of output 328 is supplied to error operation circuit 302. 12-bit output 325 from latch 320 is also supplied to error operation circuit 302.

$L_2R$ signal 164 and an $L_7\phi$ signal 162 are used as control signals for the error operation circuit 302. $L_2R$ signal 164 and $L_7\phi$ signal 162 control latches 324 and 327 such that output 325 from latch 324 corresponds to the $$\sum_{j=1}^{6} (P_{4j-2})$$

value and output 325 from latch 327 corresponds to the $$\sum_{j=1}^{6} (P_{4j-1} - P_{4j-3}).$$

Sign bits 326 and 329 of the integrated results obtained from latches 324 and 327 are supplied to reference sampling phase detection gate 314.

When $\theta = 33°$ in the NTSC mode, the Q-axis can be detected. However, when $\theta = \pm 45°$, the U-axis controlled by the PID signal can be detected.

Referring to FIG. 15, an AND gate 338 serves to detect the Q-axis. AND gates 339 and 340 serve to detect the U-axis. Outputs from gates 338 to 340 are supplied to an OR gate 341. An output 315 from OR gate 341 is supplied to reference pulse generator 316. A shift register 354 serves to detect the reference axis. A $Q_1$ output 355 from shift register 354 serves to reset a counter 356. A $Q_{62}$ output 357 from counter 356 is supplied to a shift register 358. The $Q_1$ output from shift register 358 is synchronized with $Q_{62}$ output 357. $Q_{62}$ signal 357 is then produced as $\phi_C$ signal 26 from the $Q_1$ output of shift register 358. The leading edge of $\phi_C$ signal 26 indicates the Q-axis.

Figure 16:
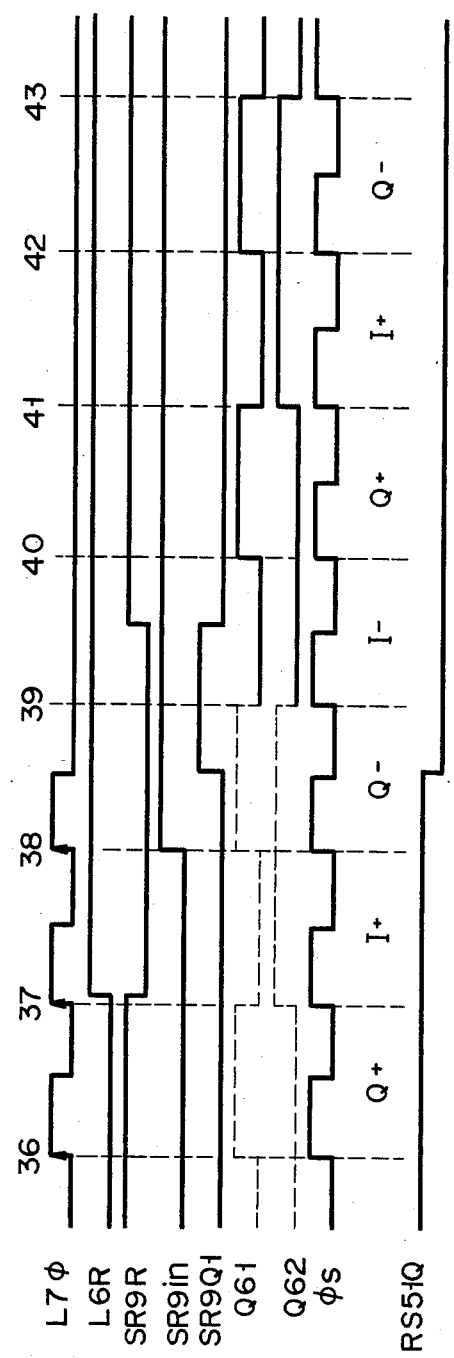
FIG. 16 is a timing chart for explaining the operation of the PLL control circuit shown in FIG. 15.

FIG. 16 shows the waveforms of $L_7\phi$ signal 162, $L_6R$ signal 165, SR9R signal 167, input 315 to shift register 354, $Q_1$ output 355 from shift register 354, $Q_{61}$ output, $Q_{62}$ output 357 from counter 356, signal $\phi_S$, and the Q output from flip-flop RS51 (FIG. 11).

The hue control is performed in a 2-bit step. Control data 49 is decoded by a data decoder 333 and its decoded output 334 is encoded by an encoder (ROM) 335. In the NTSC mode, assume that the target sampling phase $\theta$ is set at 33° (central value) when control data 49 is set at "00", that the phase $\theta$ is set at 27° when data 49 is set at "01", that the phase $\theta$ is set at 37° when data 49 is set at "10", and that the phase $\theta$ is set at 41° when data 49 is set at "11". The value tan 33° can be approximated in 6-bit data (including the Sgn bit) as "010101". Similarly, the value tan 27° can be approximated in 6-bit data as "010000"; tan 37° = "011000"; and tan 41° = "011100".

In the PAL mode, the encoded values can be controlled by PID signal 25. The control data "00" corresponds to the target sampling phase $\theta$ (= ±45°). An encoded output 336 including the Sgn bit can be approximated in 7-bit data. When PID = "1", encoded data 336 is "0111111". However, when PID = "0" (to be referred to as a $\overline{PID}$ for brevity hereinafter), encoded data 336 is "1000000". In fine, when control data 49 is set at "01", data "0110000" is obtained for $\theta$ (PID) and data "1000000" is obtained for $\theta$ ($\overline{PID}$). When control data 49 is set at "10", data "0111111" is obtained for $\theta$ (PID), and data "1110000" is obtained for $\theta$ ($\overline{PID}$). When control data 49 is set at "11", data "011111" is obtained for $\theta$ (PID), and data "1100000" is obtained for $\theta$ ($\overline{PID}$).

Predetermined encoded output (output from encoder 335) 336 is obtained for hue control in accordance with the NTSC signal and PID signal 25. Output 336 from encoder 335 indicates the value of tan $\theta$ and is supplied to error operation circuit 302.

The error operation circuit 302 comprises a multiplier 332 for multiplying output 325 from latch 324 with output 336 from encoder 335, and an adder 331 for adding an output 337 from multiplier 332 and output 330 from latch 327. A multiplication timing of multiplier 332 is governed by timing signal ($\phi m\phi$) 168. An output 343 from adder 331 is supplied to one input of an adder 344 in error integrator 304. An output 352 from a latch 351 is supplied to the other input of adder 344. An output 346 from adder 344 is supplied to latch 351. $L_{12}\phi$ signal 169 gives a latch timing of latch 351. $L_{12}\phi$ signal 169 is also supplied as detection timing signals to AND gates 348 and 347 for detecting an overflow and an underflow, respectively.

Adder 344, latch 351, and AND gates 347 and 348 constitute error integrator 304. Latch 351 has a 13-bit configuration, and 9-bit output 24 from the MSB therefrom is supplied to D/A 16 of the PLL in FIG. 1.

As described above, gate 348 serves as an overflow detection gate; it presets latch 351 which then produces all "1" outputs when output 349 is set at logic level "1". Gate 347 serves as an underflow detection gate; it resets latch 351 which then produces all "0" outputs when output 350 is set at logic level "1". An output 353 from adder 344 is an overflow output.

Referring to FIG. 15, DVCS signal 286 is supplied to an adder 361. An output 362 from adder 361 is supplied to a latch 363. An AND gate 359 generates a U-axis detection phase signal 360 in the PAL mode. Signal 360 is supplied as a clock to latch 363. Gate 359, adder 361 and latch 363 constitute burst detection integrator 308. An Sgn output 365 from integrator 308 is supplied to time constant circuit 310 and is integrated.

Time constant circuit 310 mainly comprises an adder 366, a latch 371 for latching an Sgn output 368 from adder 366, and a latch 372 for latching a 5-bit output 367 excluding Sgn output 368.

An AND gate 373 and a NOR gate 374 detect an overflow and an underflow, respectively. A detection timing signal applied to time constant circuit 310 corresponds to $\phi_m\phi$ signal 168. An output 377 from latch 371 is supplied to a PAL ident determination gate (AND gate) 379. When a $\overline{Q}_{71}$ output 381 from a counter 380 for generating the PAL ident signal is set at logic level "1", and output 377 from latch 371 is set at logic level "1", then counter 380 is reset by a reset signal 313 from gate 379 at a timing of $L_{12}\phi$ signal 169, thereby initiating the U-axis detection and PAL ident conditions. As a result, PID signal 25 is obtained as the $Q_{71}$ output from counter 380.

(Horizontal Count-Down Circuit)

FIG. 17 is a detailed block diagram of horizontal count-down circuit 32 shown in FIG. 1. Horizontal count-down circuit 32 is constituted by four large blocks 461, 462, 463 and 464. A second horizontal period memory 461 stores period data of the horizontal sync signal in accordance with an $L_4$out signal 149 from period memory 144 in FIG. 6 having predetermined continuity and periodicity, timing signal ($SR_6Q_1$out) 147, and DCK output 152 from discriminator 151. A horizontal reference mode detector 464 receives horizontal period data 424 stored in memory 461 and detects a relationship between the horizontal frequency $f_H$ and the signal $\phi_S$ so as to discriminate an HMOD signal 35 which indicates the horizontal reference mode. HMOD signal 35 is supplied to Y-C separator 38 shown in FIG. 1. When HMOD="1", Y-C separator 38 uses line correlation to separate the Y signal from the C signal in a known manner (known as an operation of a comb filter).

When HMOD="0", the line correlation could cause a very wrong separation between the Y and C signals (this would happen when sampled points on the 1H delay line are separated each other). In this case, Y-C separation is performed by a conventional BPF using the horizontal sampled points. In this manner, HMOD signal 35 serves to switch the operation of Y-C separator 38.

$H_S$ signal 139 and $f_{HFB}$ signal 18 are inputted to horizontal phase detector 463 wherein the phase of $f_{HFB}$ signal 18 is compared with that of $H_S$ signal 139. When a predetermined phase relationship therebetween is not detected, a signal 458 is supplied from horizontal phase detector 463 to horizontal sync reproduction circuit 462 so as to establish the predetermined phase relationship between $f_{HFB}$ signal 18 and $H_S$ signal 139. Data output 424 from a horizontal period memory 421 is supplied to horizontal sync reproduction circuit 462 which then generates horizontal drive signal ($f_{HD}$out) 34.

The blocks 461, 462, 463 and 464 shown in FIG. 17 will be described in detail hereinafter.

(a) Horizontal period memory 461

$L_4$out signal 149 is supplied to a subtracter 401 to which a signal 425 corresponding to the output 424 is inputted as a subtrahend. $SR_6Q_1$out signal 147 from latch pulse generator 146 is supplied to a horizontal period memory timing generator 408. Generator 408 generates various timing signals 409, 410 and 493. These timing signals 409, 410 and 493 are controlled by DCK signal 152 from discriminator 151 in FIG. 6. An output signal 402 from subtracter 401 is supplied to a difference detection gate 405. Difference detection gate 405 detects a difference between the signals 402 and 409. Gate 405 supplies control signals 403-1 and 407 respectively to a time constant switching circuit 403 and to a control signal generation gate 417 in accordance with the magnitude of the detected difference. When the difference is zero, gate 405 supplies a warbling signal 406 to an adder 412. Time constant switching circuit 403 serves to control a time constant of the system in accordance with the difference. An output 404 from time constant switching circuit 403 is supplied to one input of adder 412. The other input of adder 412 receives a 16-bit signal 423°. 16-bit signal 423° comprises upper 11-bit data (MSB side) of output 424 from horizontal period memory 421 and lower 5-bit data (LSB side) of output 423 from a horizontal period correction memory 422. Upper 11 bits of the 16-bit data from adder 412 are supplied to one input of a switching circuit 415. The other input of switching circuit 415 receives an output 427 from a standard horizontal period generator 426. An output 416 from switching circuit 415 is supplied to horizontal period memory 421. When the horizontal period does not satisfy a predetermined condition (e.g., at the power ON time), an abnormal value detection gate 431 detects from output 424 that the horizontal period is abnormal. A detection signal 432 is then supplied to a horizontal period preset circuit 433.

Horizontal period preset circuit 433 receives detection signal 432 and HSD signal 280 and supplies a signal 434 to control signal generation gate 417. Gate 417 supplies a preset timing signal 419 to horizontal sync memory 421. Gate 417 also supplies a signal 420 to switching circuit 415, and switching circuit 415 generates signal 416 corresponding to signal 427. Memory 421 is then preset by signal 419 at a standard horizontal period corresponding to signal 427.

Figure 18:
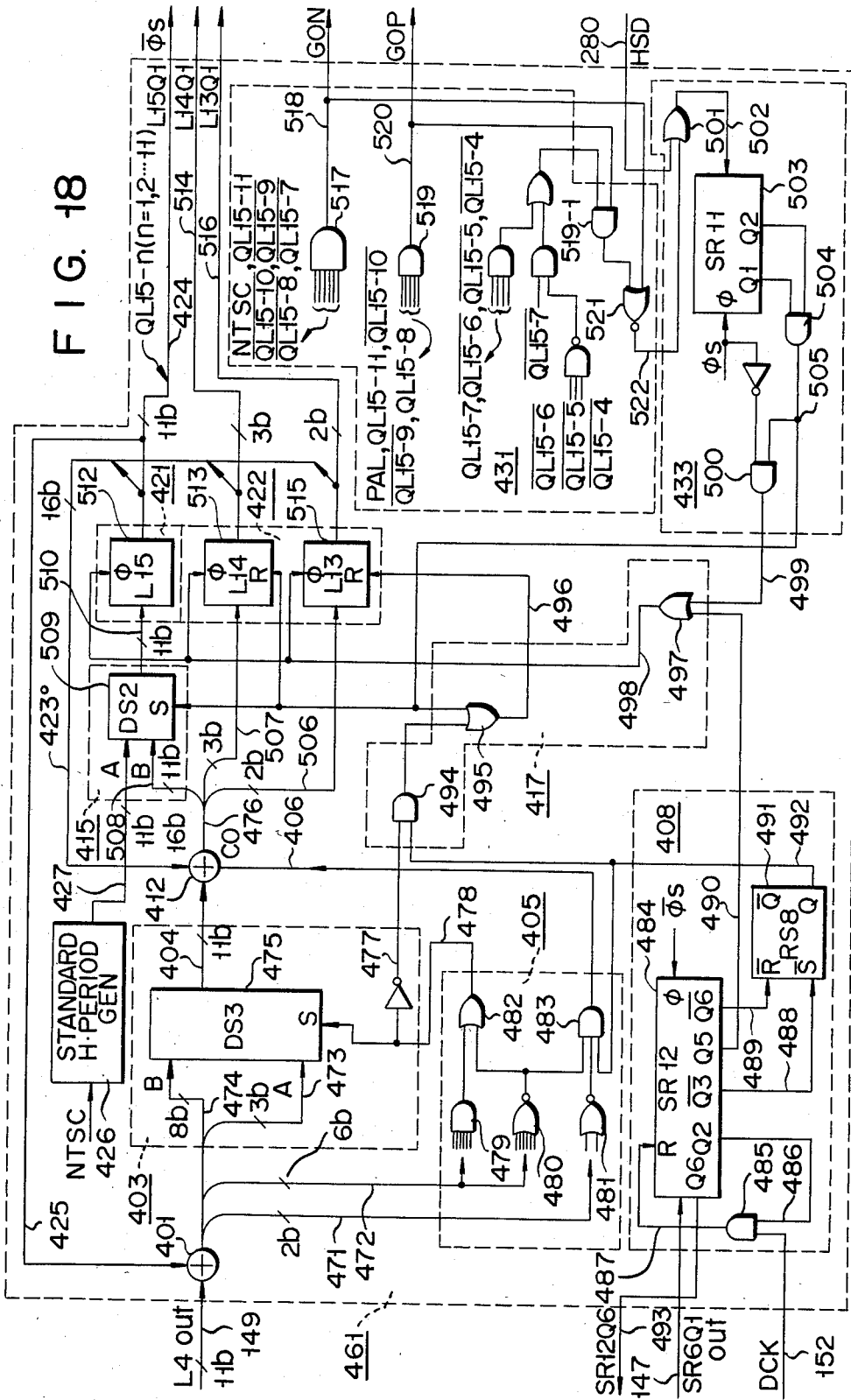
FIG. 18 is a circuit diagram showing the detailed configuration of the horizontal period memory of FIG. 17.

FIG. 18 shows a detailed circuit configuration of horizontal period memory 461. Referring to FIG. 18, horizontal period memory timing generator 408 comprises a 6-stage shift register 484, an AND gate 485, and an RS flip-flop 491.

Figure 23:
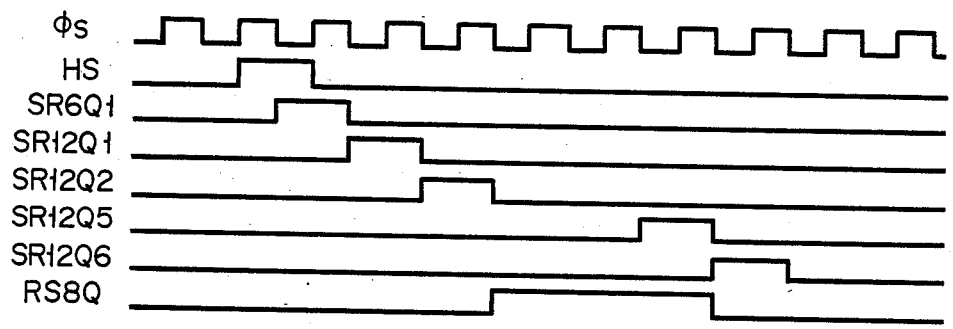
FIGS. 23 and 24 are timing charts for explaining the operation of the horizontal period memory shown in FIG. 18.

FIG. 23 is a timing chart for explaining the operation of horizontal period memory 461 in FIG. 18.

As may be seen from FIG. 18, gate 485 produces a self-reset signal 487 when an output $Q_2$ of shift register 484 and DCK signal 152 are set at logic level "1", and the outputs following the $Q_2$ output of shift register 484 are not generated. More particular, when a detected difference falls outside of the range of ±3 for the signal $\phi_S$, period memory 461 is kept inoperative or unchanged.

An effective bit length of the output from subtracter 401 is 8 bits. An 8-bit signal 474 is supplied to a B input of a data selector 475. A lower 3-bit signal 473 of signal 474 is supplied to an A input of data selector 475. An upper 6-bit signal 472 of signal 474 and a lower 2-bit signal 471 thereof are supplied to a difference detection gate 405 which then detects a magnitude of the output from subtracter 401. In difference detection gate 405, outputs from a 6-input AND gate 479 and a 6-input NOR gate 480 are supplied to an OR gate 482. An output 478 from OR gate 482 is set at logic level "1" when the difference between the outputs from gates 479 and 480 falls within a range of ±3. Otherwise, output 478 is set at logic level "0".

Output 404 from data selector 475 comprises 11 bits. When the output from subtracter 401 indicates, for example, ±2, then data "010" is supplied to the A input of data selector 475, and output 478 supplied from OR gate 482 to selector 475 is set at logic level "1". In this condition, output 404 from data selector 475 is set at "00000000010". On the other hand, when the output from subtracter 401 indicates +8, data "00000100" is supplied to the B input of data selector 475, and output 478 from OR gate 482 is set at logic level "0". In this case, output 404 from data selector 475 is set at "00000100000".

When the difference (signal 474) is large, the time constant is decreased to fasten the convergence of the system to be described later. However, when the difference is too small, the time constant is increased to guarantee stability of the system. Therefore, the convergence of the horizontal period memory 461 is fast. However, when the convergence to a predetermined value is completed, the time constant is then increased, thereby properly obtaining horizontal period storage with high precision.

Output 404 from data selector 475 is supplied to one input of adder 412. The other input of adder 412 receives 16-bit signal 423°. 16-bit signal 423° comprises 11-bit output 424 from horizontal period memory 421 and a 5-bit output constituted by outputs 514 and 516 from horizontal period correction memory 422. The LSBs of outputs 404 and 423° are aligned with each other. These outputs 404 and 423° are added by adder 412.

Warbling input 406 (for adding "1" to the LSB of the data in adder 412) applied to adder 412 is obtained as the output from an AND gate 483 when difference detection gate 405 detects zero. Upper 11-bit data 508 of a 16-bit output 476 from adder 412 is supplied to a B input of data selector 509. Three-bit data of output 476 following upper 11-bit data 508 is supplied to a latch 513, and lower 2-bit data of output 476 is supplied to a latch 515. The standard horizontal period number data is supplied from standard horizontal period generator 426 to an A input 427 of data selector 509. The standard horizontal period number data is "10000111110" corresponding to decimal "1054" in the NTSC mode, or "10010101111" corresponding to decimal "1199" in the PAL mode. An output 510 from data selector 509 is supplied to a latch 512.

Referring to FIG. 18, abnormal value detection gate 431 for detecting an abnormal horizontal period number determines whether or not the number of periods falls within a predetermined time interval. More particularly, a 6-input AND gate 517 detects whether or not the number of periods falls within a range between "1024" and "1088" in the NTSC mode. Alternatively, an AND gate 519-1 detects whether or not the number of periods falls within a range between "1160" and "1224" in the PAL mode. When the number of periods of output 424 does not fall within the predetermined range, an output 522 from a NOR gate 521 is set at logic level "1". Output 522 of logic level "1" is supplied to one input of an OR gate 501. The other input of the OR gate 501 receives HSD signal 280.

When a signal 502 inputted to a shift register 503 goes to logic level "1", an output 505 from an AND gate 504 goes to logic level "1". Output 505 serves to control data selector 509. An AND gate 500 produces a $\bar{\phi}_S$ clock 499. Output 499 from AND gate 500 and a $Q_5$ output 490 from shift register 484 are supplied to an OR gate 497. An output 498 from OR gate 497 is supplied as a clock to latches 512, 513 and 515. Output 505 from gate 504 serves to reset latch 513 and to reset latch 515 through an OR gate 495.

Figure 24:
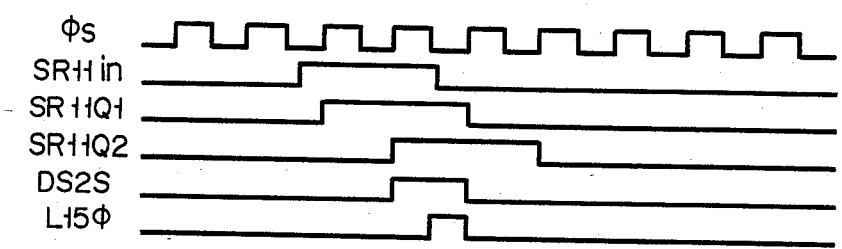

A signal 477 obtained by inverting signal 478 from OR gate 482 and a Q output 492 from flip-flop 491 serve to reset latch 515 through an AND gate 494 and OR gate 495. FIG. 24 is a timing chart for explaining the operation of the horizontal period number preset circuit.

(b) Horizontal standard mode detector 464

FIG. 19 shows a detailed circuit configuration of horizontal standard mode detector 464. Referring to FIG. 19, a horizontal standard mode detection gate 428 detects a value of output 424 from horizontal period memory 421 (FIG. 17). When gate 428 determines that the standard mode is set, it produces an output 550 of logic level "1".

FIG. 20 is a diagram for explaining definitions of standard NTSC and PAL modes. Now assume that $N = 4f_{SC}/f_H$. An input signal for setting N in a range between "904" and "916" is designated by HMOD="1" (standard-mode input). Any other input signal is designated by HMOD="0". Reference numeral 560 denotes an output from horizontal period memory 421 in terms of the output from latch 512 in FIG. 18. With respect to the output from latch 512, the range between "1048" to "1060" corresponds to HMOD="1". Reference numerals 562 and 563 denote a case in the PAL mode. With respect to the output from latch 512 in the PAL mode, the range between "1192" and "1208" corresponds to HMOD="1".

Referring to FIG. 19, gates 540, 541 and 542 serve to detect an HMOD signal for NTSC, whereas gates 544, 545, 546 and 547 serve to detect an HMOD signal for PAL. Outputs 543 and 548 from OR gates 542 and 547 are supplied to an OR gate 549 which provides detection signal 550. Detection signal 550 is supplied together with an SR12Q$_6$ signal 493 from shift register 484 (FIG. 18) to an AND gate 551 so as to reset a counter 555 and to set an RS flip-flop 558. An inverted signal of signal 550 is supplied together with signal 493 to an AND gate 552, thereby generating a signal 554 to be inputted to counter 555. RS flip-flop 558 is reset by an output 557 from a NAND gate 556 which provides as a NANDed output a logic product of signal 554 and outputs Q$_1$-Q$_3$ from counter 555. Integrator 430 must integrate 8 successive horizontal sync input signals corresponding to HMOD="0", thereby improving stability of HMOD signal 35. As a result, the stability of Y-C separation is guaranteed.

(c) Horizontal sync reproduction circuit 462

Referring to FIG. 17, horizontal sync reproduction circuit 462 causes a horizontal sync counter 445 to reproduce the horizontal sync signal in accordance with horizontal period data output 424, thereby obtaining predetermined $f_{HD}$out signal 34.

Figure 21:
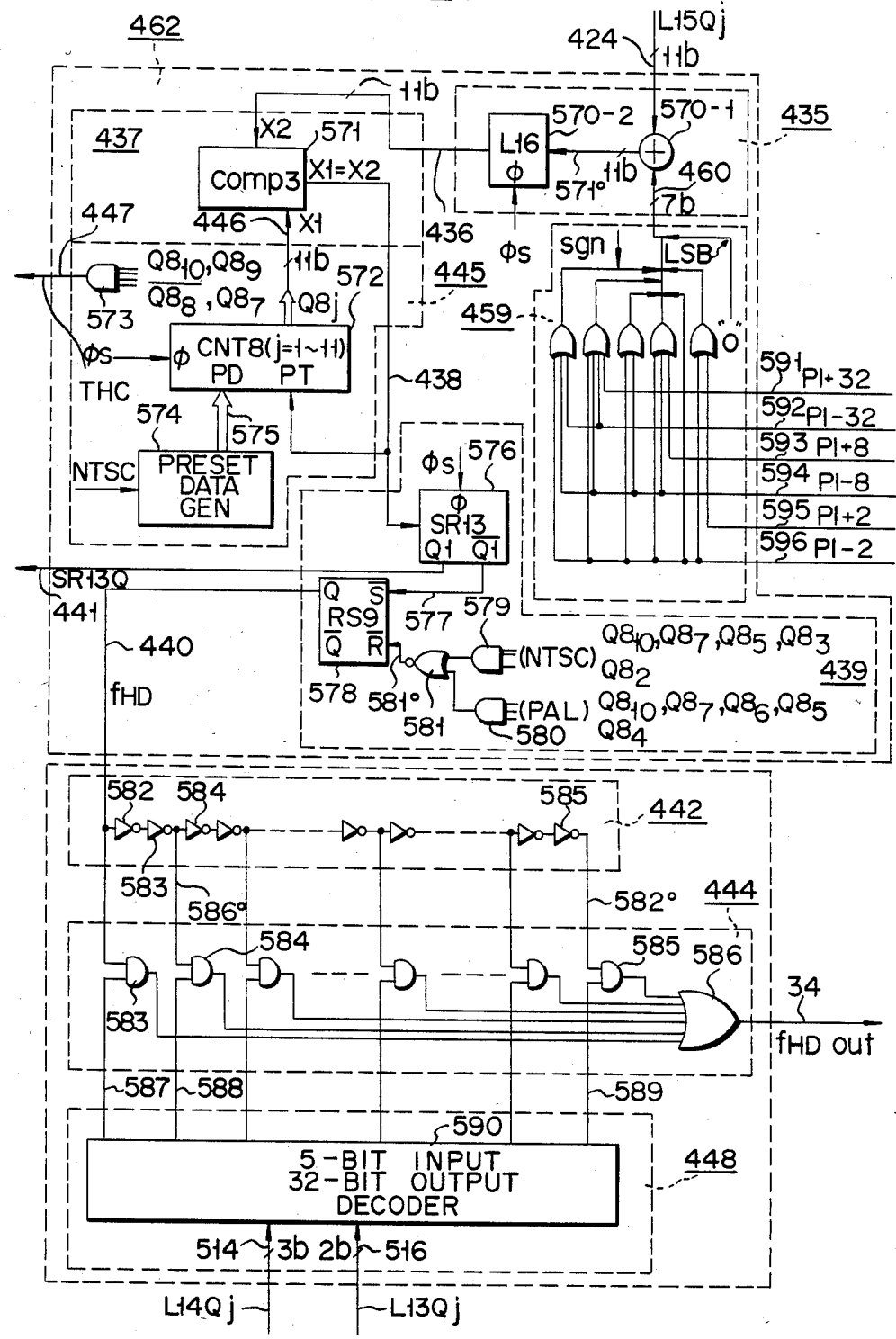
FIG. 21 is a circuit diagram showing the detailed configuration of the horizontal sync reproduction circuit of FIG. 17.

FIG. 21 shows a detailed circuit configuration of horizontal sync reproduction circuit 462. A horizontal counter preset value operation circuit 435 receives output 424 from latch 512 (FIG. 18) and an output 460 from a horizontal counter control amount encoder 459. These outputs 424 and 460 are added by an adder 570-1. Output 460 from encoder 459 serves as data for controlling the count of horizontal sync counter 445 to lock in the horizontal sync phase. When the phase of H$_S$ signal 139 coincides with that of $f_{HFB}$ signal 18, the contents of output 460 are all "0". The 11-bit output 571° from adder 570-1 is supplied to a latch 570-2 and is synchronized with the $\bar{\phi}_S$ signal. An output 436 from latch 570-2 is supplied to one input of an 11-bit comparator 571 of a coincidence detector 437. The other input of comparator 571 receives an 11-bit output 446 from a horizontal counter 572 which is a part of horizontal sync counter 445. A coincidence output 438 from comparator 571 is supplied to a preset terminal PT of counter 572 and to a shift register 576 in horizontal drive pulse generator 439. A $\overline{Q}_1$ output 577 from shift register 576 serves to set an RS flip-flop 578. A $Q_1$ output (SR13Q) 441 from shift register 576 indicates that counter 572 is preset. $Q_1$ output 441 from shift register 576 in generator 439 is supplied to horizontal phase detector 463.

Horizontal counter 572 comprises an 11-stage counter provided for $f_{HD}$out signal 34. 11-stage counter 572 receives the $\phi_S$ signal as a clock. Preset data of counter 572 corresponds to a count "145" in the NTSC mode or to a count "65" in the PAL mode. The preset data is supplied from a preset data generator 574. This preset value is larger than the preset value of horizontal period detection counter 213 (FIG. 7) by one. The count of counter 572 is extracted as a THC signal 447 through an AND gate 573.

RS flip-flop 578 in horizontal drive pulse generator 439 receives a reset signal 581° from gates 579, 580 and 581. Flip-flop 578 generates an $f_{HD}$ signal 440. The $f_{HD}$ signal 440 has drive pulses controlled in units of the $\phi_S$ clocks.

Figure 25:
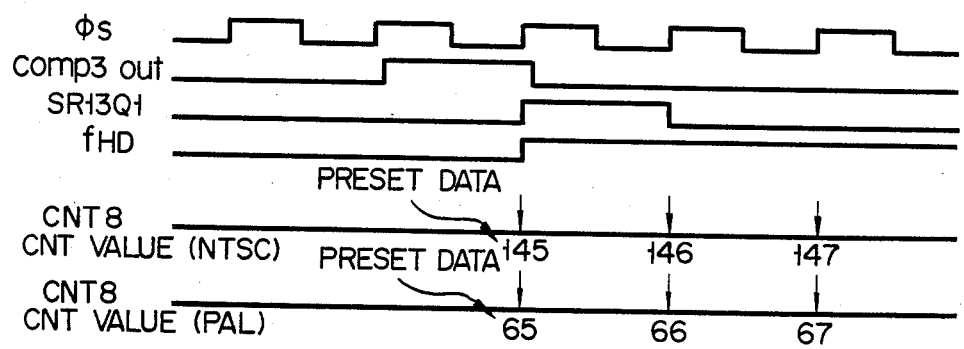
FIGS. 25 and 26 are timing charts for explaining the operation of the horizontal sync reproduction circuit shown in FIG. 21.

FIG. 25 shows output 438 from comparator 571, $Q_1$ output 441 from shift register 576, $f_{HD}$ signal 440 from flip-flop 578, and the counts of counter 572 both in the NTSC and PAL modes (CNT8).

Figure 26:
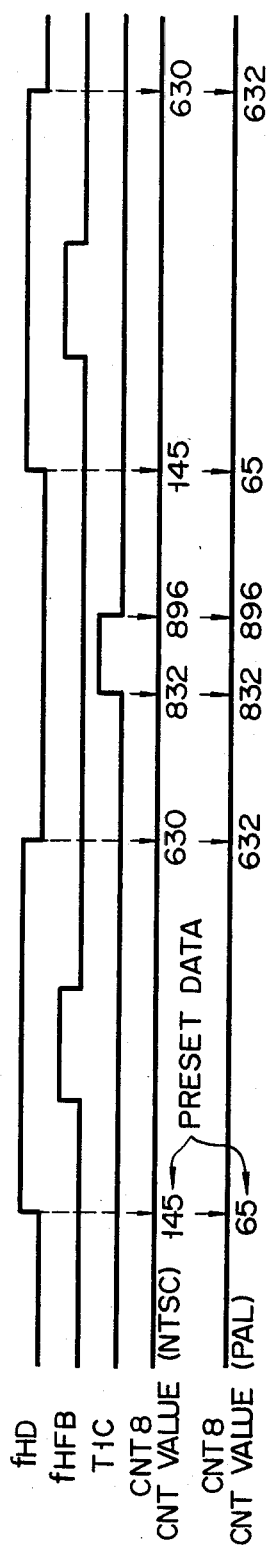

FIG. 26 shows summarized phase relationships among $f_{HD}$ signal 440, $f_{HFB}$ signal 18, THC signal 447, and NTSC and PAL count values of counter 572. Referring to FIG. 26, the count "832" corresponding to the leading edge of THC signal 447 is readily understood to be located substantially at the center of one period of $f_{HFB}$ signal 18.

A 5-bit output (upper 3-bit data 514 and lower 2-bit data 516) from horizontal period correction memory 422 (FIG. 18) is supplied to a decoder 448 (FIG. 21).

Referring to FIG. 21, decoder 448 comprises a 5-input 32-output decoder 590. When the 5-bit input of data 514 and 516 is set at "00000", a first decoded output 587 from decoder 590 is set at logic level "1". When the 5-bit input is set at "00001", a second decoded output 588 is set at logic level "1". When the 5-bit input is set at "11111", a final decoded output 589 is set at logic level "1". Each of outputs 581, 588, . . . , 589 from decoder 590 is supplied to one input of each of AND gates 583, 584, . . . , 585 in a selection gate 444.

The $f_{HD}$ signal 440 is supplied to gate 583 and to a horizontal drive pulse delay circuit 442 which is provided with taps and comprises an array of 62 inverters. A total delay amount of the array of 62 inverters of the delay circuit 442 is preferably 70 nsec in the NTSC mode. A delay amount for each inverter is about 1 nsec. Signal lines 582°, . . . , 586° are connected to every two inverters of delay circuit 442. Thus, each output of taps of circuit 442 is supplied to one input of each of AND gates 583, 584, . . . , 585 in selection gate 444. All of 32-bit outputs from AND gates 583, 584, . . . , 585 are supplied to an OR gate 586, and OR gate 586 produces $f_{HD}$out signal 34.

In this manner, an output obtained by delaying $f_{HD}$ signal 440 is selected in accordance with outputs 514 and 516 from horizontal period correction memory 422, thereby obtaining $f_{HD}$out signal 34. As a result, $f_{HD}$out signal 34 has a more precise resolution as compared with that in units of $\phi_S$ clocks.

FIG. 29 shows diagrams for explaining the effect of $f_{HD}$out signal 34 corresponding to a specific pattern on a TV screen. FIG. 29(a) shows a vertical line to be displayed on the screen. FIG. 29(b) shows a case wherein the vertical line is displayed when $f_{HD}$out signal 34 is produced in units of $\phi_S$ clocks although horizontal sync correction is not performed. When $\phi_S \neq N f_H$ (i.e., when the frequency of $\phi_S$ signal is not an integer multiple of the frequency $f_H$ as in the case of the PAL standard signal), the vertical line (dotted line in the drawing) 29-4 is displayed as indicated by the solid line. As indicated by points 29-1, 29-2 and 29-3, gear marks are formed such that each of the vertical portions thereof has a length corresponding to a period of the $\phi_S$ signal. Since the $\phi_S$ signal has a period of about 56 nsec in the PAL system, the gear marks can be visually observed. Unless the bent portions of gear marks can be neglected, a high-quality television receiver cannot be obtained.

According to this embodiment, in order to make the gear marks small enough to disable visual perception, the delay amount of $f_{HD}$ signal 440 (FIG. 21) is controlled by outputs 514 and 516 from horizontal period correction memory 422, thereby improving the resolution of horizontal sync reproduction in the order of $\phi_S$ clock or less. As a result, as shown in FIG. 29(c), the gear component thus obtained is theoretically decreased to 1/32 of the gear component of FIG. 29(b), and can be neglected.

(d) Horizontal phase detector 463

Referring again to FIG. 17, horizontal phase detector 463 detects the relationship between the phase of the horizontal sync input signal (actually, the $H_S$ signal 139) and the phase of $f_{HFB}$ signal 18, and controls horizontal sync reproduction circuit 462 in accordance with the detected phase information. As a result, horizontal phase detector 463 serves to establish a predetermined phase relationship between $H_S$ signal 139 and $f_{HFB}$ signal 18. In this case, the pull-in of phase is continuously performed and the pull-in time is short.

Figure 22:
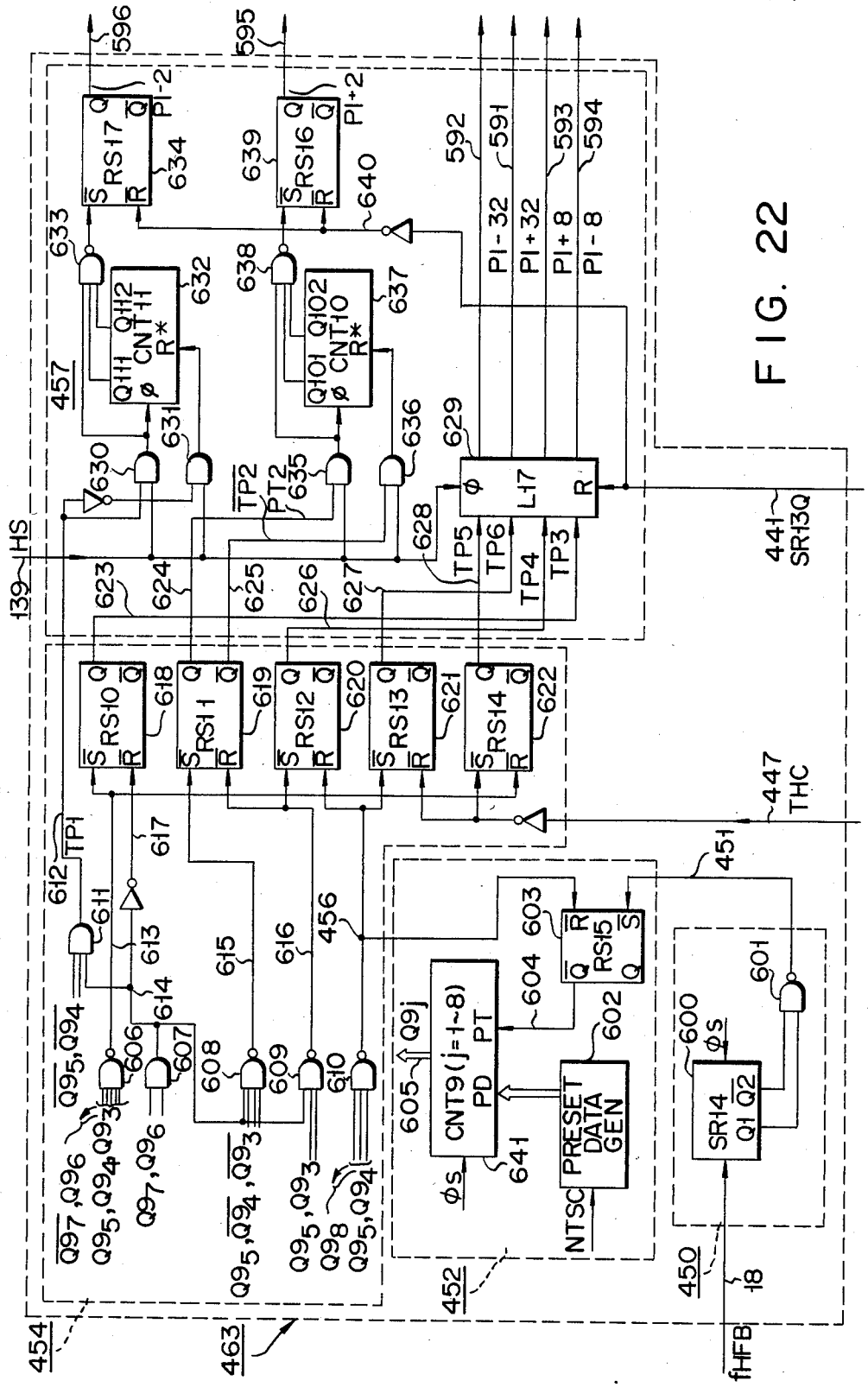
FIG. 22 is a circuit diagram showing the detailed configuration of the horizontal phase detector of FIG. 17.

FIG. 22 shows a detailed circuit configuration of horizontal phase detector 463. Referring to FIG. 22, $f_{HFB}$ signal 18 is supplied to a shift register 600 in an $f_{HFB}$ detector 450. A NAND gate 601 detects the leading edge of $f_{HFB}$ signal 18 from outputs $Q_1$ and $\overline{Q}_2$ of shift register 600, and generates a detection signal 451. An RS flip-flop 603 in an $f_{HFB}$ timing generation counter 452 is set in response to the detection signal 451 for detecting the leading edge of $f_{HFB}$ signal 18. A $\overline{Q}$ output 604 from flip-flop 603 is supplied to the preset terminal of an 8-stage counter 641. The preset value of counter 641 is "20" in the NTSC mode or "0" in the PAL mode. A comparison pulse to be described below is commonly used for the NTSC and PAL modes. An output 605 (Q9j) from counter 641 is supplied to a comparison pulse generator 454. Comparison pulse generator 454 generates various timing pulses (comparison pulses) for $f_{HFB}$ signal 18 with respect to $H_S$ signal 139 supplied thereto. There are six comparison pulses designated by reference symbols TP1, TP2, . . . , TP6. As shown in FIG. 22, these comparison pulses TP1, . . . , TP6 are generated from gates 606, 607, 608, 609, 610 and 611, and RS flip-flops 618, 619, 620, 621 and 622. An output 612 from a gate 611 is comparison pulse TP1; an output 624 from a flip-flop 619 is comparison pulse TP2; an output 623 from a flip-flop 618 is comparison pulse TP3; an output 626 from a flip-flop 620 is comparison pulse TP4; an output 628 from a flip-flop 622 is comparison pulse TP5; and an output 627 from a flip-flop 621 is comparison pulse TP6.

Figure 27:
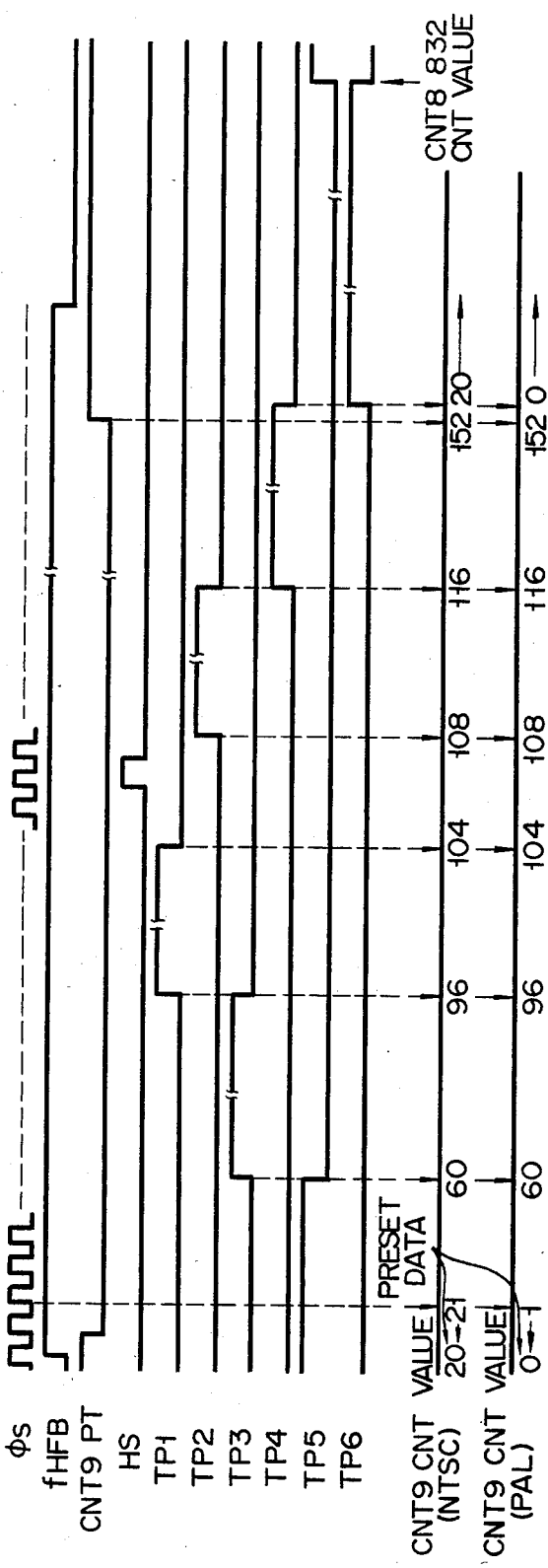
FIG. 27 is a timing chart for explaining the operation of the horizontal phase detector shown in FIG. 22.

FIG. 27 is a timing chart with respect to $f_{HFB}$ signal 18 whose phase is properly pulled or locked in, counter preset timing pulse 604 (CNT9PT), $H_S$ signal 139, and comparison pulses TP1, TP2, TP3, TP4, TP5 and TP6, together with the count values of counter 641. A range of counts "104" to "108" of counter (CNT9) 641 corresponds to an intermediate point of the time interval while $f_{HFB}$ signal 18 is set at logic level "1". The phase of $H_S$ signal 139 is locked in a point corresponding to this intermediate point.

Comparison pulses TP1 and TP2 appear at two sides of the intermediate point, as shown in FIG. 27, and are used for detecting a deviation in horizontal phase. Comparison pulses TP3 and TP4 appear during the time interval while $f_{HFB}$ signal is set at logic level "1". Comparison pulses TP3 and TP4 are used for detecting a phase deviation corresponding to 60 $\phi_S$ clocks from the intermediate point. Comparison pulses TP5 and TP6 are used for detecting a great phase difference between $f_{HFB}$ signal 18 and $H_S$ signal 139 due to, e.g., TV channel selection. Comparison pulses TP5 and TP6 are switched at a timing of THC signal (447 in FIG. 22).

Referring to FIG. 22, TP1 pulse 612, TP2 pulse 624, a TP2 pulse 425, TP3 pulse 623, TP4 pulse 626, TP5 pulse 628 and TP6 pulse 627 are supplied to a phase comparator 457. The phases of these pulses are compared with $H_S$ signal 139. TP3 pulse 623, TP4 pulse 626, TP5 pulse 628 and TP6 pulse 627 are supplied to a 4-bit latch 629. $H_S$ signal 139 is supplied to a clock input of latch 629.

A PI-8 signal 594 of logic level "1" is produced by latch 629 when $H_S$ signal 139 is received (i.e., $H_S$ signal 139 exists within the pulse width of comparison pulse TP3) for TP3="1". In this manner, when $H_S$ signal 139 is received while comparison pulses TP3, TP4, TP5 and TP6 are set at logic level "1", latch 629 produces outputs of logic level "1" corresponding respectively to the comparison pulse inputs. Outputs from latch 629 are PI−8 signal 594 corresponding to comparison pulse TP3, a PI+8 signal 593 corresponding to comparison pulse TP4, a PI+32 signal 591 corresponding to comparison pulse TP6, and a PI−32 signal 592 corresponding to comparison pulse TP5. Suffixes −8, +8, +32 and −32 of these output signals indicate control values for counts of horizontal sync counter 572 (FIG. 21) when latch outputs 591–594 are set at logic level "1". For instance, PI+32 signal 591 serves to delay the preset timing of horizontal sync counter 572 by 32 counts for phase-locking. Referring to FIG. 22, SR13Q$_1$ signal 441 is supplied from flip-flop 576 (FIG. 21) to the reset terminal of latch 629. Latch 629 is cleared every time horizontal sync counter 572 is preset. TP1 pulse 612 and TP2 pulse 624 each of which has a phase near a desired phase are used to stabilize the pull-in or lock-in operation, so that these pulses are dealt so as to differ from other comparison pulses TP3, TP4, TP5 and TP6. TP1 pulse 612 is supplied together with $H_S$ signal 139 to an AND gate 630. An output from gate 630 is supplied to a clock input of a 2-stage counter 632. An AND product (TP1·$H_S$) is supplied from an AND gate 631 to a reset terminal R* of counter 632. A flip-flop 634 is set through a NAND gate 633 and is reset in response to an $\overline{SR13Q_1}$ signal 640, so that a PI−2 signal 596 is obtained. In other words, when four successive $H_S$ signals 139 are generated while TP1 pulse 612 exists, control signal PI−2 is obtained. Regarding TP2 pulse 624, a PI+2 signal 595 is produced by a flip-flop 639 in the same manner as described above.

The outputs (PI−2 signal 596, PI+2 signal 595, PI−8 signal 594, PI+8 signal 593, PI−32 signal 592 and PI+32 signal 591) from phase comparator 457 are supplied to the horizontal counter control encoder 459 (FIG. 21). When PI+32 signal 591 is set at logic level "1", encoder 459 generates data "0100000" indicating the value +32. When PI−32 signal 592 is set at logic level "1", encoder 459 generates data "1100000" indicating the value −32. Output 460 (7 bits) from encoder 459 is supplied to adder 570-1 in horizontal counter preset value operation circuit 435.

(Vertical Count-Down Circuit)

Vertical count-down circuit 36 in FIG. 1 comprises a vertical reproduction circuit 36-1 and a sync discriminator 36-2 for discriminating whether or not $H_S$ signal 139 is detected, as shown in FIG. 28. The basic circuit configuration of vertical reproduction circuit 36-1 is described in detail in Japanese Patent Disclosure No. 55-159673 entitled "Vertical Sync Circuit". For further detail, refer to this prior art. Vertical reproduction circuit 36-1 in the embodiment of the present invention can be obtained by partially modifying this conventional circuit. Only the modified parts will be described. Counters 651 and 653 respectively correspond to parts designated by reference numerals 10 and 12 of FIG. 4 of the above-described prior art (JPD No. 55-159673). In the embodiment of the present invention, a Q8$_6$ signal 650 from counter 572 (FIG. 21) is used as an input clock to counter 651. A Q$_2$ output 652 from counter 651 is supplied as a clock input to counter 653. A 2·$f_H$ signal 654 is then obtained from counter 653. SR13Q$_1$ signal 441 is supplied as a reset input to counter 651, and the logical OR of SR13Q$_1$ signal and Reset 1 signal (refer to FIG. 4 of JPD No, 55-159673) 658 is supplied as a reset input to counter 653. CSV signal 126 is used in place of the signal CS of JPD No. 55-159673. The $f_{VD}$out signal 37 is FIG. 28 is the vertical drive signal. The $f_{VD}$out signal 37 is supplied to a counter 660. $H_S$ signal 139 is supplied as a reset input to counter 660. An RS flip-flop 663 stores data for determining establishment of synchronization. RS flip-flop 663 is set by an $\overline{H_S}$ signal 662 and is reset by an output from a NAND gate 661. When at least one $H_S$ signal 139 is produced during one period of the $f_{VD}$out signal, it is determined that synchronization is established, so that the Q output from flip-flop 663 goes to logic level "1". The Q output of logic level "1" is synchronized by a shift register 665 with the $\phi_S$ signal. HSD signal 280 is produced by shift register 665. Thus, when synchronization is established, HSD="1" is established. A signal 664 is obtained as the logical OR of the Q and $\overline{Q}$ outputs of flip-flop 663 and the inverted reset input (R) of flip-flop 663. Signal 664 is supplied to shift register 665 and serves to initialize clamp circuit 19 (FIG. 13) every two vertical periods of the $\overline{HSD}$.

Figure 30:
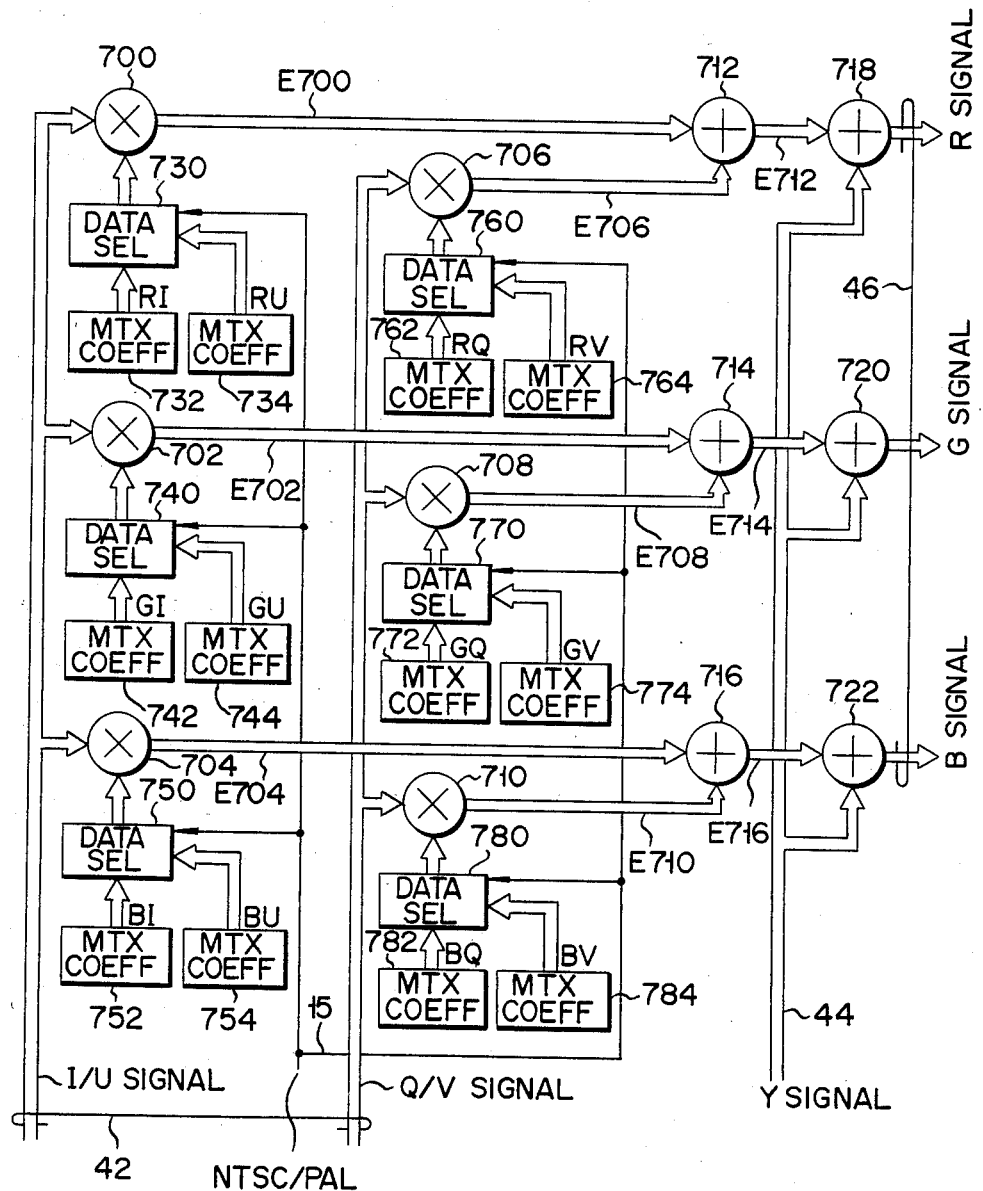
FIG. 30 shows a block diagram of an RGB matrix of FIG. 1.

FIG. 30 shows a block configuration of RGB matrix 45 in FIG. 1. Digital demodulated I signal (NTSC) or U signal (PAL) 42 from color process circuit 41 is supplied to multipliers 700, 702 and 704. Digital demodulated Q signal (NTSC) or V signal (PAL) 42 from color process circuit 41 is supplied to multipliers 706, 708 and 710. NTSC/PAL switching signal 15 is supplied as a selection instruction to data selectors 730, 740, 750, 760, 770 and 780. Selector 730 selects one of a multiplicand RI (NTSC) from a matrix coefficient generator 732 and a multiplicand RU (PAL) from a matrix coefficient generator 734 according to NTSC/PAL switching signal 15. Similarly, selector 740 selects one of multiplicands GI (NTSC) and GU (PAL) from generators 742 and 744. Selector 750 selects one of multiplicands BI (NTSC) and BU (PAL) from generators 752 and 754. Selector 760 selects one of multiplicands RQ (NTSC) and RV (PAL) from generators 762 and 764. Selector 770 selects one of multiplicands GQ (NTSC) and GV (PAL) from generators 772 and 774. Selector 780 selects one of multiplicands BQ (NTSC) and BV (PAL) from generators 782 and 784.

Selector 730 supplies the selected multiplicands (RI or RU) to multiplier 700 in accordance with signal 15. Then, multiplier 700 outputs a signal E700 corresponding to $RI \times I$ signal or $RU \times U$ signal. Similarly, multiplier 702 outputs a signal E702 corresponding to $GI \times I$ signal or $GU \times U$ signal. Multiplier 704 outputs a signal E704 corresponding to $BI \times I$ signal or $BU \times U$ signal. Multiplier 706 outputs a signal E706 corresponding to $RQ \times Q$ signal or $RV \times V$ signal. Multiplier 708 outputs a signal E708 corresponding to $GQ \times Q$ signal or $GV \times V$ signal. Multiplier 710 outputs a signal E710 corresponding to $BQ \times Q$ signal or $BV \times V$ signal. Signal E700 is added to signal E706 by an adder 712. Adder 712 supplies an added result E712 to an adder 718. Adder 718 adds Y signal 44 from Y process circuit 43 (FIG. 1) to result E712, and provides an R signal. Similarly, signal E702 is added to signal E708 by an adder 714 which supplies an added result E714 to an adder 720. Adder 720 adds Y signal 44 to result E714 and provides a G signal. Signal E704 is added to signal E710 by an adder 716 which supplies an added result E716 to an adder 722. Adder 722 adds Y signal 44 to result E716 and provides a B signal. The output signals from adders 718, 720 and 722 are supplied as the RGB signal 46 to D/A converter 54 (FIG. 1).

Digital Y-C separator 38 in FIG. 1 may be one as disclosed in Japanese Patent Application No. 57-132262. The correspondence between FIG. 1 of the present invention and FIG. 4 of the above JPA is as follows:

| FIG. 1 |   | FIG. 4 of JPA |
|---|---|---|
| 11 | → | 110 |
| 15 | → | 146 |
| 39 | → | 130 |
| 40 | → | 131 |
| 38 | → | 126, 128 |

Further, a configuration of switching of Y-C separator 38 by HMOD signal 35 is disclosed in Japanese Patent Disclosure No. 57-21192.

Digital color process circuit 41 in FIG. 1 may be one as disclosed in said JPA No. 57-132262. A color control/color killer 135 and a color demodulator 139 in FIG. 1 of the JPA correspond to the circuit 41 of the present invention. The correspondence between FIG. 1 of the present invention and FIG. 1 of the above JPA is as follows:

| FIG. 1 |   | FIG. 1 of JPA |
|---|---|---|
| 25, 26 | → | 140 |
| 28 | → | 111 |
| 41 | → | 135, 139 |
| 39 | → | 130 |
| 42 | → | 141 |

Detailed configurations of blocks 135 and 139 JPA are shown in FIGS. 14 to 16 of the JPA.

Digital Y process circuit 43 may be one as disclosed in FIG. 1 of said JPA No. 57-132262. The correspondence between FIG. 1 of the present invention and FIG. 1 of the above JPA is as follows:

| FIG. 1 |   | FIG. 1 of JPA |
|---|---|---|
| 40 | → | 131 |
| 48 | → | 132 |
| 43 | → | 129 |
| 44 | → | 133 |

Detailed configurations of the Y process circuit is shown in FIG. 7 of the JPA.

A count-down system 657 for vertical sync reproduction in FIG. 28 may be one as shown in FIG. 3 of Japanese Patent Disclosure No. 55-159674.

What is claimed is:

1. A digital television receiver comprising:
digital conversion means for converting an analog video signal to a digital video signal;
color process means coupled to said digital conversion means for composing digital color signals from said digital video signal;
analog conversion means coupled to said process means for composing analog color signals from said digital color signals, said analog color signals being of a form suitable for driving a color CRT; and
timing control means, coupled to said digital conversion means and to said process means, responsive to said digital video signal, for controlling a converting operation of said digital conversion means and a composing operation of said color process means,
wherein said digital conversion means includes:
converter means, responsive to a sampling clock, for analog-to-digital converting said analog video signal to said digital video signal, the converting rate of said converter means depending on said sampling clock;
generator means coupled to said converter means for generating said sampling clock; and
controller means coupled to said generator means and to said timing control means for controlling phase and frequency components of said sampling clock so that a phase of said sampling clock corresponds to a prescribed phase axis of a color system applied to the digital television receiver,
wherein said color process means includes:
separator means coupled to said converter means for separating a digital chrominance and digital luminance signals from said digital video signal;
first processor means, coupled to said separator means and to said timing control means, for processing said digital chrominance signal to generate a digital demodulated output under the control of said timing control means;
second processor means coupled to said separator means for processing said digital luminance signal to generate a digital processed luminance output;
matrix means, coupled to said first and second processor means, for generating said digital color signals by combining said digital demodulated output and said digital luminance output with a given matrix coefficient; and a horizontal counter means, coupled to said separator means and to said timing control means, and being responsive to a horizontal flyback signal, for controlling said horizontal flyback signal to generate a horizontal drive signal and for providing a horizontal sync mode signal to said separator means under the control of said timing control means, said horizontal drive signal being suitable for horizontal scanning said CRT, wherein said separator means performs the separating operation for one color system when said horizontal sync mode signal designates said one color system, and performs the separating operation for another color system when said horizontal sync mode signal designates said another color system.

2. A receiver according to claim 1, wherein said controller means generates a PAL ident signal in accordance with said digital video signal and said horizontal flyback signal when said horizontal sync mode signal designates said one color system, and supplies said PAL ident signal to said first processor means so that said first processor means generates the digital demodulated output consistent with a PAL system.

3. A receiver according to claim 2, wherein said digital conversion means includes pedestal clamp means coupled to said converter means and to said timing control means, and being responsive to said digital video signal, for reproducing analog DC components of said analog video signal from said digital video signal and supplying said analog DC components to said converter means under the control of said timing control means.

4. A receiver according to claim 1, wherein said process means further includes vertical counter means coupled to said horizontal counter means and to said timing control means, for counting a count output of said horizontal counter means to generate a vertical drive signal under the control of said timing control means, said count output corresponding to said horizontal drive signal and said vertical drive signal being used for vertical scanning of said CRT.

5. A receiver according to claim 4, wherein said digital conversion means includes pedestal clamp means coupled to said converter means and to said timing control means, and being responsive to said digital video signal, for reproducing analog DC components of said analog video signal from said digital video signal and supplying said analog DC components to said converter means under the control of said timing control means.

6. A receiver according to claim 1, wherein said digital conversion means includes pedestal clamp means coupled to said converter means and to said timing control means, and being responsive to said digital video signal, for reproducing analog DC components of said analog video signal from said digital video signal and supplying said analog DC components to said converter means under the control of said timing control means.

7. A digital television receiver comprising:

an A/D converter circuit for sampling an analog video signal according to a predetermined sampling clock and converting the analog video signal to a digital video signal;

a sync detector/timing generator for separating a composite sync signal from the digital video signal, detecting a horizontal sync signal, and generating a timing signal;

a pedestal clamp circuit for detecting a pedestal level of the digital video signal in accordance with the timing signal from said sync detector/timing generator and generating a digital output signal;

D/A converter means for converting the digital output signal from said pedestal clamp circuit to an analog signal which is then superimposed as a clamping voltage on the analog video signal;

a phase-locked loop (PLL) circuit controlled by a horizontal flyback signal and the timing signal from said sync detector/timing generator so as to synchronize the sampling clock with a phase of a color burst contained in the digital video signal;

a horizontal count-down circuit for obtaining a horizontal sync reproduction signal in accordance with the horizontal flyback signal and the horizontal sync signal from said sync detector/timing generator;

a vertical count-down circuit for obtaining a vertical sync reproduction signal in accordance with a signal from said horizontal count-down circuit and the composite sync signal from said sync detector/timing generator;

a Y-C separator controlled by a signal from said horizontal count-down circuit so as to separate a luminance signal and a chrominance signal from the digital video signal;

a chrominance signal processing circuit for processing the chrominance signal separated by said Y-C separator;

a luminance signal processing circuit for processing the luminance signal generated by said Y-C separator;

a matrix circuit for obtaining three-primary signals in accordance with signals obtained from said chrominance signal processing circuit and said luminance signal processing circuit;

means for converting the three-primary signals from said matrix circuit to analog signals and supplying the analog signals to a CRT;

means for processing the horizontal sync reproduction signal and supplying a horizontal sync reproduction signal to a horizontal deflection circuit of the CRT; and means for processing the vertical sync reproduction signal and supplying a vertical sync reproduction signal to a vertical deflection circuit of the CRT.

8. A digital television receiver according to claim 7, wherein said sync detector/timing generator, said PLL circuit, said horizontal count-down circuit, said vertical count-down circuit, said Y-C separator, and said matrix circuit are controlled by an NTSC/PAL switching signal.

* * * * *